US008468218B2

(12) United States Patent
Shinada et al.

(10) Patent No.: US 8,468,218 B2
(45) Date of Patent: Jun. 18, 2013

(54) REPRODUCING APPARATUS, REPRODUCING CONTROL METHOD, AND PROGRAM

(75) Inventors: Mamoru Shinada, Kanagawa (JP); Motohiko Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 202 days.

(21) Appl. No.: 12/960,813

(22) Filed: Dec. 6, 2010

(65) Prior Publication Data
US 2011/0161466 A1 Jun. 30, 2011

(30) Foreign Application Priority Data
Dec. 28, 2009 (JP) ................................ 2009-298149

(51) Int. Cl.
*G06F 15/16* (2006.01)
(52) U.S. Cl.
USPC ........................................................ 709/219
(58) Field of Classification Search
USPC ................. 709/223, 230, 236, 200, 229, 226, 709/231, 234
See application file for complete search history.

(56) References Cited

U.S. PATENT DOCUMENTS

| 6,046,874 | A | * | 4/2000 | Takahashi | ........................ 360/65 |
| 7,613,443 | B2 | * | 11/2009 | Ryu et al. | ....................... 455/403 |
| 7,746,738 | B2 | * | 6/2010 | Ueda et al. | .................. 369/47.12 |
| 7,787,343 | B2 | * | 8/2010 | Matsushita et al. | ........ 369/53.45 |
| 2003/0014475 | A1 | * | 1/2003 | Komori | .......................... 709/200 |
| 2006/0263068 | A1 | * | 11/2006 | Jung | ............................... 386/112 |
| 2007/0230289 | A1 | * | 10/2007 | Minabe et al. | ............. 369/24.01 |
| 2008/0065248 | A1 | * | 3/2008 | Araki et al. | ...................... 700/94 |
| 2008/0310819 | A1 | * | 12/2008 | Akiyama et al. | ................ 386/94 |
| 2009/0003592 | A1 | * | 1/2009 | Hanai | .............................. 380/29 |
| 2010/0039974 | A1 | * | 2/2010 | Toshimitsu et al. | ............ 370/311 |
| 2010/0082741 | A1 | * | 4/2010 | Kawada | ......................... 709/203 |
| 2011/0023078 | A1 | * | 1/2011 | Takatori et al. | ................ 725/134 |

FOREIGN PATENT DOCUMENTS

JP 2009-231974 10/2009

* cited by examiner

*Primary Examiner* — Asad Nawaz
*Assistant Examiner* — Syed S Ali
(74) *Attorney, Agent, or Firm* — Oblon, Spivak, McClelland, Maier & Neustadt, L.L.P.

(57) ABSTRACT

There is provided a reproducing apparatus including a server, a communication unit for communicating with a control apparatus that transmits a request for setting content, a request for reproducing and a request for stopping, a reproducing processing unit for a processing upon the received request regarding reproducing, and a reproducing control nit for controlling a state of processing execution in the reproducing processing unit, wherein the reproducing control unit sets a primary standby time and maintains a state of reproducing if received the request for stopping in the state of reproducing, or if ended the reproduction of the content data, and further sets a secondary standby time after the primary standby time has elapsed if received the request for setting content before the primary standby time has elapsed, and makes content data being newly set reproduced if received the request for reproducing before the secondary standby time has elapsed.

8 Claims, 9 Drawing Sheets

REPRODUCING APPARATUS, REPRODUCING CONTROL METHOD, AND PROGRAM

BACKGROUND OF THE INVENTION

1. Field of the Invention

The present invention relates to a reproducing apparatus, a reproducing control method, and a program.

2. Description of the Related Art

In recent years, apparatuses complied with the DLNA (Digital Living Network Alliance) standard, for example, are getting popular. Using an apparatus complied with the DLNA standard realizes, for example, a content reproducing system for indicating movie, still image, music, or the like, between apparatuses connected on a network.

Meanwhile, a technology for reproducing content data between apparatuses connected to the network has been developing. An example of the technology for reproducing content data between apparatuses connected to the network is disclosed in Japanese Unexamined Patent Application Publication No. 2009-231974, for example.

SUMMARY OF THE INVENTION

An existing content reproducing system complied with the DLNA standard (hereinafter, referred to as "the existing content reproducing system") includes a reproducing apparatus (hereinafter, referred to as "the reproducing apparatus 10"), a control apparatus (hereinafter, referred to as "the control apparatus 20"), and a server (hereinafter, referred to as "the server 30"), for example, (in a case of a 3 Box model).

The server 30 stores content data, and transmits the content data to an external apparatus via a network in order to provide the content data to the external apparatus. The control apparatus 20 externally controls processing regarding reproducing the content data in the reproducing apparatus 10, such as determination on which content data stored in the server is to be reproduced by the reproducing apparatus 10, reproducing/stopping the determined content data by the reproducing apparatus 10, or the like. The reproducing apparatus 10 reproduces locally the content data obtained from the server via the network. Here, in the existing content reproducing system, the reproducing apparatus 10 plays a role of DMR (Digital Media Renderer). Moreover, in the existing content reproducing system, the control apparatus 20 plays a role of DMC (Digital Media Controller), and the server 30 plays a role of a DMS (Digital Media Server).

In the existing content reproducing system, the control apparatus 20 transmits a request regarding reproducing the content data such as the following, for example, to the reproducing apparatus 10, and the reproducing apparatus 10 performs a processing related to reproducing the content data responding to the request for reproducing the received content data. Here, since requests regarding reproducing content data as the following are requests defined by the DLNA standard, if the reproducing apparatus 10 complies with the DLNA standard, it can perform a processing responding to the requests regarding reproducing content data shown in the followings:

request for setting content (for example, "SetAVTransportURI")
request for reproducing (for example, "Play")
request for stopping (for example, "Stop")

More specifically, the reproducing apparatus 10 sets content data to be reproduced by communicating with the server 30 based on a received request for setting content, and reproduces the content data being set based on a request for reproducing that is subsequently received. Moreover, if received a request for stopping while reproducing the content data upon the request for reproducing, the reproducing apparatus 10 stops reproducing the content data upon the request for stopping. In the existing reproducing system, the reproducing apparatus 10 performs processing based on requests regarding reproducing content data that have been received as described above, for example, so as to realize reproducing and stopping content data between apparatuses connected on the network.

Further, the reproducing apparatus 10 can reproduce continuously a plurality of content data by switching the plurality of content data for reproducing. However, a method how the control apparatus 20 specifies a plurality of content data so as to make the reproducing apparatus 10 reproduce continuously the specified content data is not defined uniquely by the DLNA standard. Therefore, the existing content reproducing system combines, for example, the above requests regarding reproducing content data so as to reproduce a subsequent content data after reproduction of certain content data has ended (switching content data to be reproduced).

One example of the above method to switch content data by combining requests regarding reproducing content data is that the control apparatus 20 transmits "a request for stopping→a request for setting content→a request for reproducing" in series to the reproducing apparatus 10 which is reproducing certain content data. In the above case, the reproducing apparatus 10 performs "stopping reproducing a piece of content data→setting another piece of content data→reproducing the other piece of content data that has been set" based on "the request for stopping→the request for setting content→the request for reproducing" that has been received. Therefore, transmitting "the request for stopping→the request for setting content→the request for reproducing" in series by the control apparatus 20 enables the reproducing apparatus 10 to switch content data to be reproduced.

One example of another method to switch content data by combining requests regarding reproducing content data described above is that the control apparatus 20 transmits "a request for setting content" to the reproducing apparatus 10 which is reproducing certain content data. Here, when the reproducing apparatus 10 switches reproducing content data upon the above request for setting content, the reproducing apparatus 10 performs "stopping reproducing a piece of content data, setting another piece of content data and reproducing the other piece of content data that has been set" as a series of processing. In other words, the "request for setting content" which the control apparatus 20 transmits in the above case plays a role of a "request for switching content" for requesting for switching content data. However, since the DLNA standard does not define uniquely a method for reproducing continuously content data, the reproducing apparatus 10 which has received "the request for setting content" may not be always able to perform the "stopping reproducing a piece of content data, setting another piece of content data and reproducing the other piece of content data that has been set" as a series of processing.

Therefore, in the content reproducing system which complies with the DLNA standard, the control apparatus 20 often transmits in series "a request for stopping→a request for setting content→a request for reproducing" to the reproducing apparatus 10 so as to further ensure to realize switching content data in the reproducing apparatus 10.

However, as described above, the DLNA standard does not define uniquely a method for reproducing continuously content data, and various kinds and brands of apparatuses can play a role of the control apparatus 20 in the existing content reproducing system. For that reason, transmitting timings for the request regarding reproducing content data in the existing control apparatus 20 are not steady, and kinds or orders of requests for reproducing content data that the control apparatus 20 transmits are not steady, either.

Therefore, in the existing content reproducing system, when the reproducing apparatus 10 switches content data for reproducing, there may occur issues, for example, such as (a) or (b) below.

(a) When the reproducing apparatus 10 switches a screen from a basic screen like a TV (Television) broadcasting viewing screen and reproduces content data (image data), the basic screen is displayed for a moment at the time of switching the content data.

(b) When the reproducing apparatus 10 switches audio for a basic channel like a basic channel of radio broadcasting and reproduces content data (audio data), the audio of the basic channel is reproduced for a moment at the time of switching the content data.

Moreover, since the existing technology for reproducing content data between apparatuses connected on the network does not solve the above-mentioned issues at all, although the technology is applied, issues as the above (a) or (b) may occur.

For that reason, even if the existing technology related to the existing content reproducing system and the existing technology for reproducing content data between apparatuses connected on the network (hereinafter, referred to as "the existing technologies") are applied, it can hardly realize a smooth switching of content data in the reproducing apparatuses.

In light of the foregoing, it is desirable to provide a reproducing apparatus, a reproducing control method, and a program, which are novel and improved, and which are capable of facilitating a smooth switching of content data to be reproduced and of preventing user's convenience from being decreased.

According to an embodiment of the present invention, there is provided a communication unit for communicating with a server that stores content data, and with a control apparatus that transmits, as a request regarding to reproducing the content data stored in the server, a request for setting content that requests for setting content data to be reproduced, a request for reproducing that requests for starting reproducing the content data being set by the request for setting content, or a request for stopping that requests for stopping reproducing the content data being reproducing upon the request for reproducing, a reproducing processing unit for performing a processing related to reproducing content data upon the request regarding reproducing that the communication unit has received, and a reproducing control unit for controlling a state of processing execution related to reproducing content data in the reproducing processing unit, wherein the reproducing control unit sets a primary standby time and maintains a state of reproducing in the reproducing processing unit until after the primary standby time has elapsed, if received the request for stopping in the state of reproducing in which the reproducing processing unit is reproducing content data, or if ended the reproduction of the content data in the state of reproducing in which the reproducing processing unit is reproducing content data, further sets a secondary standby time after the primary standby time has elapsed and further maintains a state of reproducing in the reproducing processing unit until after the secondary standby time has elapsed, if received the request for setting content before the primary standby time has elapsed, makes the reproducing processing unit reproduce content data that has been newly set upon the request for setting content, if received the request for reproducing before the secondary standby time has elapsed, and makes the state of processing execution related to reproducing content data in the reproducing processing unit transition from the state of reproducing to a basic state that does not perform reproducing the content data, if not received the request for setting content before the primary standby time has elapsed, or if not received the request for reproducing before the secondary standby time has elapsed.

Such configuration can facilitate a smooth switching of content data to be reproduced, and prevent user's convenience from being decreased.

The reproducing control unit sets the secondary standby time longer than the primary standby time.

Moreover, the reproducing control unit may make the reproducing processing unit perform communication upon the request for setting content with the server, if received the request for setting content before the primary standby time has elapsed, and suspend setting the secondary standby time until the communication upon the request for setting content with the server has been completed.

Moreover, the reproducing control unit may set the primary standby time, which is to be set if reproducing of the content data ends while the reproducing processing unit is in the state of reproducing, longer than the primary standby time, which is to be set if request for stopping is received while the reproducing processing unit is in the state of reproducing.

Moreover, the reproducing control unit may make a user notified that a request regarding reproducing the content data is received, if the request for setting content received before the primary standby time has elapsed, or if received the request for reproducing before the secondary standby time has elapsed.

Moreover, the reproducing control unit does not allow the reproducing processing unit to perform a processing upon the request for stopping, if received the request for stopping before the primary standby time has elapsed or before the secondary standby time has elapsed.

According to another embodiment of the present invention, there is provided a reproducing control method including the steps of reproducing content data responding a request for reproducing, if received the request for reproducing which has been transmitted from a control apparatus transmitting a request regarding reproducing content data stored in a server, and which requests for starting reproducing the content data, primary maintaining for setting a primary standby time, and for maintaining a state of reproducing the content data in the step of reproducing until after the primary standby time has elapsed, if received a request for stopping that requests stopping reproducing the content data being reproduced upon the request for reproducing transmitted from the control apparatus while reproducing the content data in the step of reproducing, or if completed reproducing the content data while reproducing the content data in the step of reproducing, a secondary maintaining for further setting a secondary standby time after the primary standby time has elapsed, and for further maintaining the state of reproducing the content data that has been maintained in the step of the primary maintaining until after the secondary standby time has elapsed, if received a request for setting content that requests for setting content data to be reproduced transmitted from the control apparatus before the primary standby time being set in the step of primary maintaining has elapsed, a reproducing switching for reproducing content data that has been newly set upon the request for setting content, if received the request for reproducing before the secondary standby time has elapsed, and a transitioning state for making the state of the content data maintained in the step of the primary maintaining or the step of the secondary maintaining transition to a basic state that does not perform reproducing the content data, if not received the request for setting content before the primary standby time has elapsed, or if not received the request for reproducing before the secondary standby time has elapsed.

Using such method can facilitate a smooth switching of content data to be reproduced, and prevent the user's convenience from being decreased.

According to another embodiment of the present invention, there is provided a program causing a computer to execute the steps of reproducing content data responding a request for reproducing, if received the request for reproducing which has been transmitted from a control apparatus transmitting a request regarding reproducing content data stored in a server, and which requests for starting reproducing the content data, a primary maintaining for setting a primary standby time, and for maintaining a state of reproducing the content data in the step of reproducing until after the primary standby time has elapsed, if received a request for stopping that requests stopping reproducing the content data being reproduced upon the request for reproducing transmitted from the control apparatus while reproducing the content data in the step of reproducing, or if completed reproducing the content data while reproducing the content data in the step of reproducing, a secondary maintaining for further setting a secondary standby time after the primary standby time has elapsed, and for further maintaining the state of reproducing the content data that has been maintained in the step of the primary maintaining until after the secondary standby time has elapsed, if received a request for setting content that requests for setting content data to be reproduced transmitted from the control apparatus before the primary standby time being set in the step of primary maintaining has elapsed, a reproducing switching for reproducing content data that has been newly set upon the request for setting content, if received the request for reproducing before the secondary standby time has elapsed, and a transitioning state for making the state of the content data maintained in the step of the primary maintaining or the step of the secondary maintaining transition to a basic state that does not perform reproducing the content data, if not received the request for setting content before the primary standby time has elapsed, or if not received the request for reproducing before the secondary standby time has elapsed.

Using such program can facilitate a smooth switching of content data to be reproduced, and prevent the user's convenience from According to the present invention, it is possible to facilitate a smooth switching of content data to be reproduced and to prevent the user's convenience from being decreased.

DETAILED DESCRIPTION OF THE EMBODIMENT(S)

Figure 1:
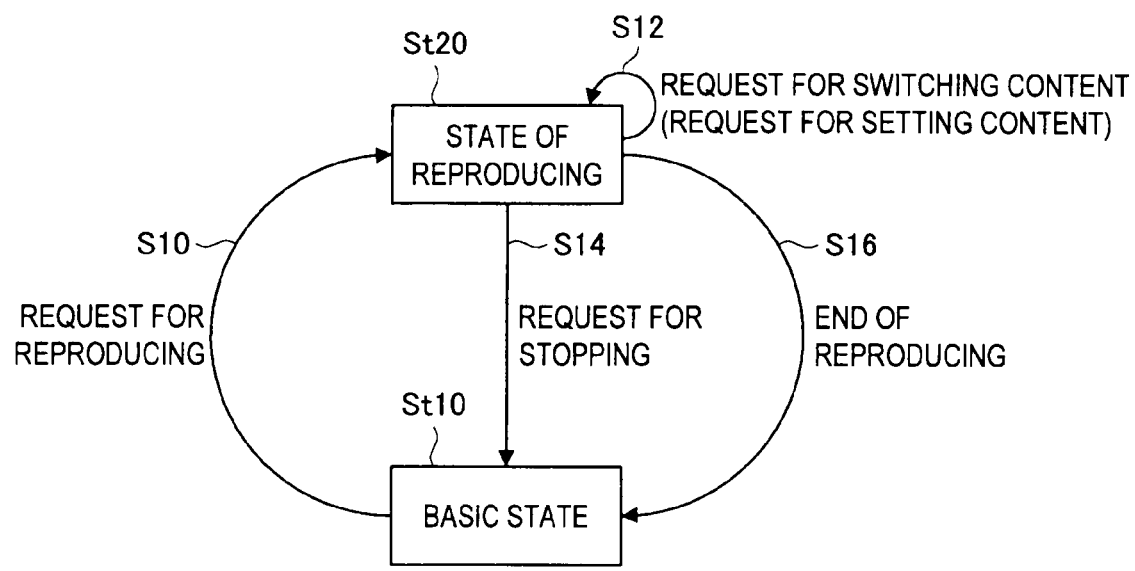
FIG. 1 is a state transition diagram for illustrating a state transition related to reproducing content data in an existing reproducing apparatus.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order:

1. Approach according to the embodiment of the present invention
2. Reproducing apparatus according to the embodiment of the present invention
3. Program according to the embodiment of the present invention Approach According to the Embodiment of the Present Invention Before explaining a configuration of a reproducing apparatus (hereinafter, referred to as "the reproducing apparatus 100") that configures a content reproducing system according to the embodiment of the present invention (hereinafter, there may be a case to be referred to as "the content reproducing system 1000"), an explanation will be given on a reproducing-switching approach according to the embodiment of the present invention.

In the following, it will be described an example case where a content reproducing system 1000 according to the embodiment of the present invention is a system of 3Box model in the DLNA standard, which is configured from the reproducing apparatus 100, a control apparatus (hereinafter, referred to as "the control apparatus 200"), and a server (hereinafter, referred to as "the server 300"). Note that in the content reproducing system 1000 according to the embodiment of the present invention, for example, the control apparatus 200 and the server 300 may be one unit of apparatus.

The following explanation will be given on an assumption that the control apparatus 200 transmits a request for setting content, a request for reproducing, and a request for stopping as requests regarding reproducing content data, and that the reproducing apparatus 100 performs processing regarding reproducing the content data based on the request for setting content, the request for reproducing, and the request for stopping, which have been received. Here, the request for setting content according to the embodiment of the present invention is data requesting for setting content data to be reproduced, and corresponds to "SetAVTransportURI" in the DLNA. The request for reproducing according to the embodiment of the present invention is data requesting for starting reproducing the content data that has been set upon the request for setting content, and corresponds to "Play" in the DLNA. Moreover, the request for stopping according to the embodiment of the present invention is data requesting for stopping reproducing the content data that is reproducing upon the request for reproducing, and corresponds to "Stop" in the DLNA.

In the following, it will be described an example case where content data according to the embodiment of the present invention is image data indicating images (here and hereinafter meaning movie images or still images), that is, where the reproducing apparatus 100 reproduces the content data to display image indicated by the content data on a display screen. Note that the content data according to the embodiment of the present invention is not limited to image data, but may be audio data that indicates sound (including music), for example.

[Issues with the Existing Reproducing Apparatus 10]

Before explaining about the reproducing-switching approach according to the embodiment of the present invention, more specific explanation will be given on issues possibly occurring when the reproducing apparatus 10 according to the existing technology would perform switching content data based on the request regarding reproducing content data that has been received. FIG. 1 is a state transition diagram for illustrating a state transition related to reproducing content data in an existing reproducing apparatus 10. The reproducing apparatus 10 includes a basic state St10 and a state of reproducing St20 as states regarding reproducing content data.

The basic state St10 is a state where the reproducing apparatus 10 does not reproduce content data. For example, if the reproducing apparatus 10 is a television set, which can receive the television broadcasting, the reproducing apparatus 10 in the basic state St10 displays a broadcasting viewing screen according to the received broadcasting wave as a basic screen on the display screen. The state of reproducing St20 is a state where the reproducing apparatus 10 reproduces content data. The reproducing apparatus 10 in the state of reproducing St20 reproduces content data stored in the server 30, and displays a reproduction screen, on which image indicated by the content data is displayed, on the display screen.

(i) Transition from the Basic State St10 to the State of Reproducing St20

The reproducing apparatus 10 sets content data to be reproduced based on the request for reproducing (more precisely, the request for setting content and the request for reproducing) that the control apparatus 20 has transmitted, and reproduces the content data (S10). Therefore, a screen displayed on the display screen of the reproducing apparatus 10 will be switched from the basic screen to the reproduction screen.

(ii) Switching Content Data Based on a Request for Switching Content

When a request for switching content (here and hereinafter meaning a request for setting content) is received in the state of reproducing St20, the reproducing apparatus 10 sets content data corresponding to the request for switching content, and reproduces the content data (S12). If the processing of step S12 has been normally performed, the screen displayed on the display screen of the reproducing apparatus 10 will be switched from the reproduction screen displaying an image that has been indicated by one piece of content data to the reproduction screen displaying an image that has been indicated by another content data being newly set.

However, the processing of step S12 is performed in the reproducing apparatus 10 having functions for switching content data based on the received request for switching content, not in the reproducing apparatus 10 having no such functions. In other words, there is no versatile method for switching content data performed by the processing of step S12.

(iii) Transition from the State of Reproducing St20 to the Basic State St10

The reproducing apparatus 10 stops reproducing content data based on the request for stopping that the control apparatus 20 has transmitted (S14). Moreover, when reproducing content data being reproduced has ended, the reproducing apparatus 10 ends displaying the reproduction screen on the display screen (S14). Therefore, a screen displayed on the display screen of the reproduction apparatus 10 will be switched from the reproducing screen to the basic screen.

(iv) Switching Content Data Based on a Combination of Requests Regarding Reproducing Content Data As described in (ii) above, switching content data based on the request for switching content is not versatile. Consequently, in the content reproducing system, the control apparatus 20 combines requests regarding reproducing content data, such as "a request for stopping→a request for setting content→a request for reproducing", for example, and transmits them, which results in switching content data in the reproducing apparatus 10.

Figure 2:
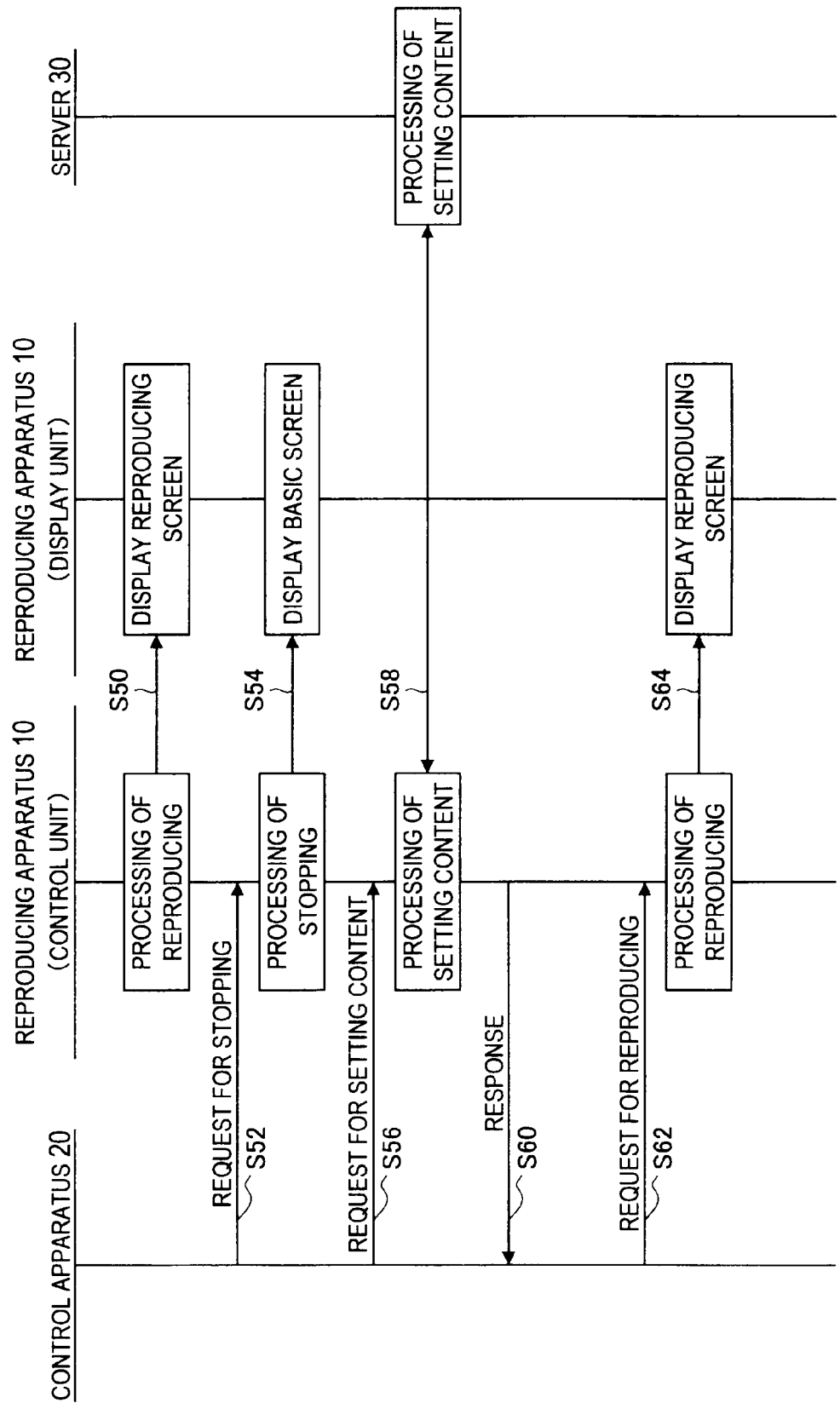
FIG. 2 is an explanatory diagram for illustrating an example of a processing related to switching content data to be reproduced in the existing reproducing apparatus.

FIG. 2 is an explanatory diagram for illustrating an example of a processing related to switching content data to be reproduced in the existing reproducing apparatus 10. FIG. 2 shows the control apparatus 20 and the server 30 which are configuring an existing content reproducing system that performs the processing in cooperation with the reproducing apparatus 10.

Here, FIG. 2 shows an example of a processing in a case where the reproducing apparatus 10 includes a control unit (not shown) that performs a processing responding to the request regarding the reproducing of the content data, and a display unit (not shown) that displays various screens. Moreover, FIG. 2 shows an example of a processing in a case where the reproducing apparatus 10 performs a processing of reproducing content data based on a request for reproducing so as to display a reproduction screen (S50), that is, an example of a processing in a case where the reproducing apparatus 10 is in the state of reproducing St20.

The control apparatus 20 transmits a request for stopping (S52). When received the request for stopping transmitted by the control apparatus 20 in step S52, the reproducing apparatus 10 stops, upon the request for stopping, reproducing content data that is reproducing in step S50 (S54). Consequently, the basic screen will be displayed on the display screen of the reproducing apparatus 10.

The control apparatus 20 that has transmitted the request for stopping in step S52 transmits a request for setting content (S56). When received the request for setting content transmitted from the control apparatus 20 in step S56, the reproducing apparatus 10 communicates with the server 30 based on the request for setting content, and sets the content data subject to be reproduced corresponding to the request for setting content (S58). When completed the setting of content data in step S58, the reproducing apparatus 10 transmits a respond indicating that the setting of content data has been completed (an example of a respond to a request for setting content) to the control apparatus 20 (S60).

When received the respond transmitted from the reproducing apparatus 10 in step S60, indicating that the setting of the content data has been completed, the control apparatus 20 transmits a request for reproducing (S62). When received the request for reproducing transmitted from the control apparatus 20 in step 62, the reproducing apparatus 10 reproduces the content data being set in step S58 (S64). Consequently, a reproduction screen indicating an image corresponding to the content data that has been set in step S58 will be displayed on the display screen of the reproducing apparatus 10.

In the existing content reproducing system the reproducing apparatus 10 performs the processing shown in FIG. 2, for example, in cooperation with the control apparatus 20 and the server 30 so that the reproduction screen displaying an image indicated by the reproduced content data will be switched with a reproduction screen displaying an image indicated by a newly set content data.

However, as shown in FIG. 2, the existing content reproducing system displays a basic screen at a time of switching content data (corresponds to the issue (a) mentioned above). Therefore, in the existing content reproducing system, it is not possible to switch content data smoothly since the existing content reproducing system displays a basic screen at a time of switching content data.

As mentioned above, the DNLA standard does not uniquely define a method of reproducing continuously content data. For that reason, a combination of requests for reproducing content data which the control apparatus 20 configuring the existing content reproducing system transmits for switching content data is not limited to the above pattern of "a request for stopping→a request for setting content→a request for reproducing" but may be various patterns. For example, some of the control apparatuses 20 transmit "a request for stopping→a request for stopping→a request for setting content→a request for reproducing" so as to instruct the reproducing apparatus 10 to switch content data to be reproduced. Here, as described above, if the control apparatus 20 transmits a plurality of requests for stopping to the reproducing apparatus 10, it may increase the risk that the basic screen will be displayed at a time of switching content data.

As described in (i) to (iv) above, in the existing content reproducing system, the reproducing apparatus 10 performs a processing regarding reproducing content data based on the request regarding reproducing content data transmitted by the control apparatus 20 so as to reproduce the content data. However, since the existing content reproducing system has a possibility to display the basic screen at a time of switching content data in the reproducing apparatus 10, it may not be able to expect for a smooth switching content data.

Overview of Switching Approach According to the Embodiment of the Present Invention As described above, in the existing content reproducing system, there may be a risk that the basic screen will be displayed at a time of switching content data in the reproducing apparatus 10 (hereinafter, it may be referred to as "possibly occurring issues in the existing content reproducing system"), consequently it is not possible to expect for a smooth switching of content data. That is because the reason why the basic screen is displayed at the time of switching content data in the existing content reproducing system is that a state regarding reproducing of content data in the reproducing apparatus 10 transitions as "a state of reproducing St20→a basic state St10→a state of reproducing St20".

Here, one measure to prevent the possibly occurring issues in the existing content reproducing system is, for example, that the reproducing apparatus does not perform a processing responding to the request for stopping (a processing of stopping reproducing of content data) at the time when received the request for stopping, and waits for a prescribed standby time for the next request for reproducing content data. In other words, one of measures to prevent the possibly occurring issues in the existing content reproducing system is to transition via a standby state at a time of transition from the state of reproducing St20 to the basic state St10 in the reproducing apparatus.

When the standby state is configured as above, the reproducing apparatus cancels the standby state and performs a processing responding to the request for stopping (transition from the standby state to the state of reproducing) after a prescribed standby time has elapsed from the time received the request for stopping (so-called, timeout). Moreover, when received the request for setting content and the request for reproducing in the standby state, the reproducing apparatus performs a processing corresponding to each of the received request for setting and the received request for reproducing respectively, and reproduces newly set content data (transition from the standby state to the state of reproducing).

Therefore, if the request for setting content and the request for reproducing are received in the standby state, the reproducing apparatus can set content data to be subsequently reproduced and reproduce the content data without a processing corresponding to the request for stopping to display the basic screen. Therefore, in a case where the standby state is configured as above, since a processing corresponding to the request for stopping will not be performed at the time of receiving the request for stopping, it can be possible to prevent the possibly occurring issues in the existing content reproducing system.

Here, as described above, in order to prevent the possibly occurring issues in the existing content reproducing system by configuring the standby state as a state according to reproducing the content data in the reproducing apparatus, the standby time is necessary to be set relatively long. This is because that there may be a case where reception of the request regarding the reproducing the content data may be late due to a network delay, or the like, and the request regarding the reproducing the content data would possibly be transmitted in various patterns from the control apparatus as described above.

However, if the standby time has been set long in order to prevent the possibly occurring issues in the existing content reproducing system, there would be a possibility that the user's convenience will be ruined. For example, other than the case of switching the content data being reproducing as described above, the reproducing apparatus receives the request for stopping when the user who is operating the control apparatus would like to stop the content data. When the standby time has been set long, even if the user would like to stop the content data as above, the reproducing apparatus can display the basic screen only after the pre-set standby time has elapsed. Therefore, when the standby time has set long in order to prevent the possibly occurring issues in the existing content reproducing system, it ruins the user's convenience since it takes a long time from when the reproducing apparatus stops reproducing of the content data to when the basic screen is displayed.

As described above, one of measures to prevent the possibly occurring issues in the existing content reproducing system is to set a standby time when a request for stopping is received while the reproducing apparatus is in a state of reproducing so as to make the state of reproducing transition to the standby state. However, merely to set the standby time still has a risk that the user's convenience will be ruined.

[Overview of Switching Approach]

In the embodiment of the present invention, the standby time, in which the reproducing apparatus 100 configures the standby state, is set having two stages so as to prevent the user's convenience from being decreased, and to prevent the possibly occurring issues in the existing content reproducing system.

More specifically, the reproducing apparatus 100 sets "a primary standby time" when received the request for stopping under the state of reproducing when the content data is reproducing, or when reproduction of the content data has ended in the state of reproducing, and maintains the state of reproducing until after the primary standby time has elapsed. Moreover, when received the request for setting content before the primary standby time has elapsed, the reproducing apparatus 100 further sets "a secondary standby time" after the primary standby time has elapsed, and further maintains the state of reproducing until after the secondary standby time has elapsed (that is, extending the standby time).

Here, setting the primary standby time and the secondary standby time in the reproducing apparatus 100 means starting a counter of a timer for determining elapse of the primary standby time or the secondary standby time, for example. The reproducing apparatus 100, for example, makes the display screen continue displaying an image in the last frame (in a case where the content data is moving image, for example) of the content data being reproducing so as to maintain the state of reproducing.

If being set the standby time with two stages: the primary standby and the secondary standby time, the reproducing apparatus 100 becomes capable of determining that a user of the control apparatus 200 wants to stop the content data when the request for setting content is not received before the primary standby time has elapsed. Consequently, the reproducing apparatus 100 cancels maintaining of the state of reproducing in the above case, and makes the state transition related to reproducing content data transition from the state of reproducing into the basic state in which the content data is not reproducing. Therefore, even when the user of the control apparatus 200 wants to stop the content data, the user needs to wait for the primary standby time only.

Here, since the reproducing apparatus 100 has set standby time with two stages: the primary standby time and the secondary standby time, during the standby state, it is enough as far as the possibly occurring issues in the existing content reproducing system can be prevented in the total time of the primary standby time and the secondary standby time. In other words, the reproducing apparatus 100 can set the primary standby time shorter than the standby time being set for the measure to prevent the possibly occurring issues in the existing content reproducing system above. Therefore, by making the state of reproducing transition to the basic state when the request for setting content is not received before the primary standby time has elapsed, the reproducing apparatus 100 can prevent the user's convenience from being decreased.

Moreover, if the request for reproducing content data being set has been received before the secondary standby time has elapsed, the reproducing apparatus 100 reproduces the content data being set responding to the request for reproducing. Consequently, the state regarding reproducing of the content data in the reproducing apparatus 100 is not to transition from the state of reproducing to the basic state, and so the reproducing apparatus 100 can switch the content data to be reproduced without displaying the basic screen on the display screen. In other words, the reproducing apparatus 100 can prevent the possibly occurring issues in the existing content reproducing system.

Moreover, if the request for reproducing content data being set has not been received before the secondary standby time has elapsed, the reproducing apparatus 100 cancels the maintaining of the state of reproducing and makes the state transition related to reproducing content data transition from the state of reproducing to the basic state in which the content data is not producing. Therefore, in the reproducing apparatus 100, if not received the request regarding reproducing of the content data transmitted from the control apparatus 200 when the secondary standby time has elapsed, there is no possibility that maintaining the state of reproducing causes an event where a display of the display screen will not be back to the base screen from the reproduction screen (an event to decrease the user's convenience).

As described above, in the content reproducing system 1000 according to the embodiment of the present invention, the reproducing apparatus 100 sets the standby time with two stages: the primary standby time and the secondary standby time, so as to prevent the user's convenience from being decreased and the possibly occurring issues in the existing content reproducing system. Therefore, having the reproducing apparatus 100 facilitates smooth switching of content data to be reproduced and prevents the user's convenience from being decreased.

The reproducing apparatus 100 sets the secondary standby time longer than the primary standby time among the two stages of standby time. Here, if transmitting "a request for stopping→a request for setting content→a request for reproducing" from the control apparatus 200 causes the reproducing apparatus 100 to switch content data to be reproduced, the longer time from when the request for stopping is received to when the request for reproducing is received is, the more effective it prevents the basic screen from being displayed at a time of switching. On the other hand, if the user of the control apparatus 200 wants to stop reproducing the content data, it is preferable that the basic screen will be displayed as soon as when the request for stopping has been received. The reproducing apparatus 100 can realize both of these with a balance, by setting the secondary standby time longer than the primary standby time in the two stages of standby time.

Processing Related to Switching Approach According to the Present Invention

Subsequently, a concrete explanation will be given on an example of a processing in the reproducing apparatus 100 for realizing a switching approach according to the embodiment of the present invention.

[1] The First Example of Processing in the Reproducing Apparatus 100

Figure 3:
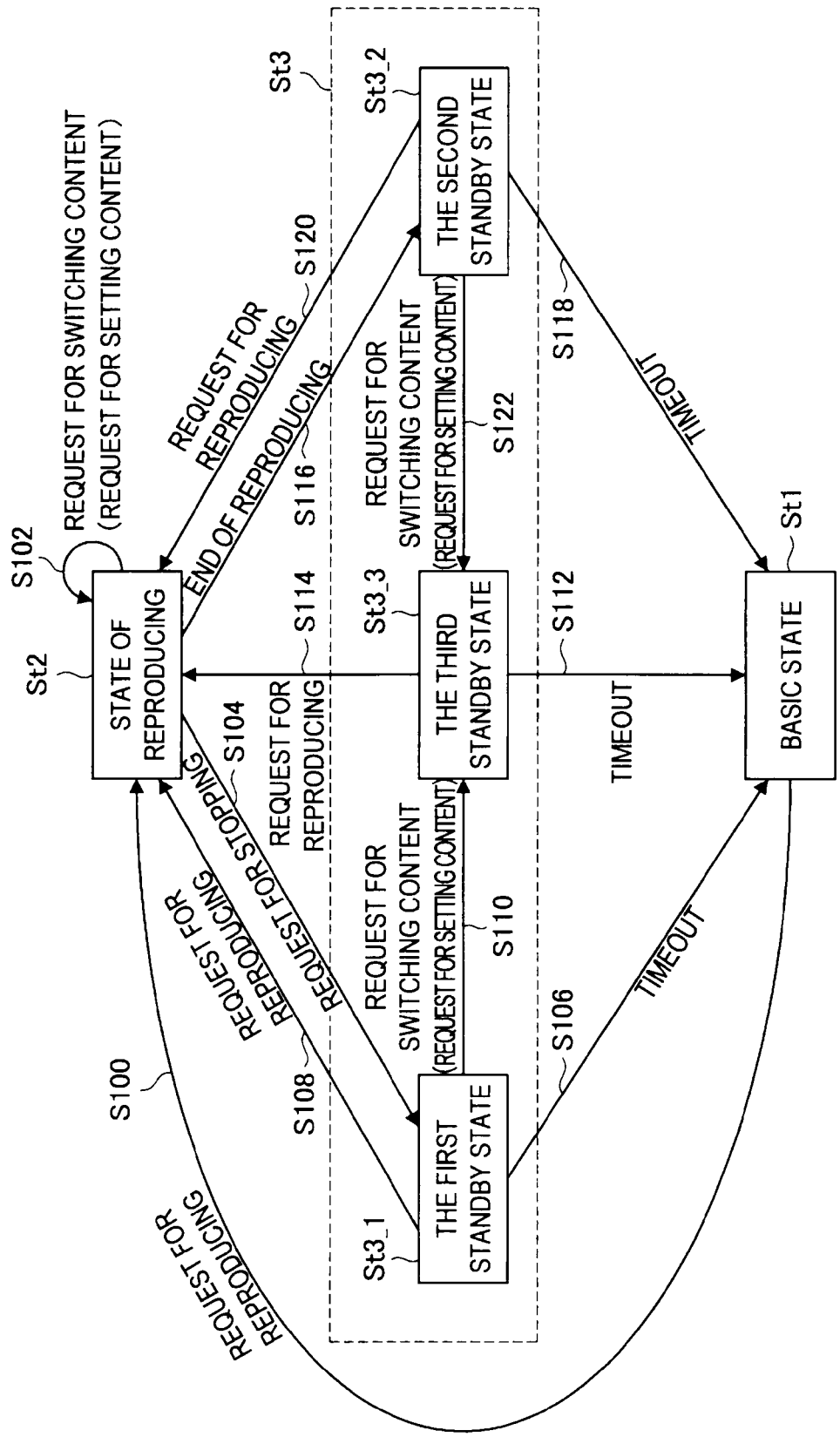
FIG. 3 is a state transition diagram for illustrating an example of a state transition related to reproducing content data in a reproducing apparatus according to an embodiment of the present invention.

FIG. 3 is a state transition diagram for illustrating an example of a state transition related to reproducing content data in the reproducing apparatus 100 according to an embodiment of the present invention. The reproducing apparatus 100 includes a basic state St1, a state of reproducing St2, and a standby state St3, as the states related to reproducing content data. Here, the states related to reproducing content data, shown in FIG. 3, corresponds to a state of processing execution related to reproducing content data in a reproducing processing unit (later-described) included by the reproducing apparatus 100.

The basic state St1 is a state where the reproducing apparatus 10 does not reproduce content data. For example, if the reproducing apparatus 100 is a television set, which can receive the television broadcasting, the reproducing apparatus 100 in the basic state St1 displays a broadcasting viewing screen according to the received broadcasting wave as a basic screen on the display screen, similar to the standby state St10 in the reproducing apparatus 10 shown in FIG. 1. The state of reproducing St2 is a state where the reproducing apparatus 100 reproduces content data. The reproducing apparatus 100 in the state of reproducing St2, similar to the standby state St2 in the reproducing apparatus 10 shown in FIG. 1, reproduces content data stored in the server 300, and displays a reproduction screen, on which image indicated by the content data is displayed, on the display screen.

The standby state St3 is a state for maintaining the state of reproducing St1, and includes a first standby state St3_1, a second standby state St3_2, and a third standby state St3_3. The first standby state St3_1 is a standby state which is to transition from the state of reproducing St1 when the request for stopping is received while the reproducing apparatus 100 is in the state of reproducing St1. The second standby state is a state which is to transition from the state of reproducing St1 when the reproduction of content data has ended while the reproducing apparatus 100 is in the state of reproducing St1. Lastly, the third standby state St3_3 is a standby state which is to transition from the first standby state St3_1 or the second standby state St3_2 when the request for setting content (hereinafter, there may be referred to as "the request for switching content") has been received while the reproducing apparatus 100 is in either the first standby state St3_1 or the second standby state St3_2. Here, each of the first standby state St3_1 and the second standby state St3_2 corresponds to the above the first standby state respectively, and the third standby state St3_3 corresponds to the above the second standby state.

(I) Transition from the Basic State St1 to the State of Reproducing St2

Similar to Step S10 in the reproducing apparatus 100 shown in FIG. 10, the reproducing apparatus 10 sets content data to be reproduced based on the request for reproducing (more precisely, the request for setting content and the request for reproducing) that the control apparatus 200 has transmitted, and reproduces the content data (S100). Therefore, a screen displayed on the display screen of the reproducing apparatus 100 will be switched from the basic screen to the reproduction screen.

(II) Switching Content Data Based on a Request for Switching Content

When a request for switching content is received in the state of reproducing St2, the reproducing apparatus 100 sets content data corresponding to the request for switching content similar to step S12 in the reproducing apparatus 100 shown in FIG. 1, and reproduces the content data (S102). If the processing of step S102 has been normally performed, the screen displayed on the display screen of the reproducing apparatus 100 will be switched from the reproduction screen indicated by an image that has been indicated by one piece of content data to the reproduction screen indicated by an image that has been indicated by another content data. Note that, as described above, there is no versatile switching content data by the processing of step S102.

(III) When the Request for Stopping has Been Received in the State of Reproducing St2

When the request for stopping is received in the state of reproducing St2, the reproducing apparatus 100 makes the state of reproducing St2 transition to the first standby state St3_1 (S104). Under the first standby state St3_1, the reproducing apparatus 100 sets prescribed standby time (the primary standby time), such as for 2 seconds, for example, and maintains the state of reproducing St2 until after the standby time has elapsed. In other words, the reproduction screen that has been displayed under the state of reproducing St2 is to be displayed on the display screen of the reproducing apparatus 100 under the first standby state St3_1. Hereinafter, the standby time that the reproducing apparatus 100 sets in the first standby state St3_1 may be referred to as "the first standby time".

When the request regarding the reproducing of the content data transmitted from the control apparatus 200 before the first standby time has elapsed, the reproducing apparatus 100 determines it as timeout and makes the first standby state St3_1 transition to the basic state St1 (S106). The above processing cancels maintaining the state of reproducing St1, and the basic screen will be displayed on the display screen of the reproducing apparatus 100.

Note that if the request for stopping transmitted from the control apparatus 200 is received again before the first standby time has elapsed, the reproducing apparatus 100 do not perform any processing responding to the request for stopping that has been received again, for example, and determines it as timeout after the first standby time has elapsed. As described above, since the DNLA standard does not define uniquely a method for reproducing continuously content data, some of the control apparatuses 200 which may set the content reproducing system 1000 may transmit a plurality of request for stopping, such as "a request for stopping→a request for stopping→a request for setting content→a request for reproducing". Here, if the processing responding to the request regarding the reproducing of the content data that has been received every time when the irregular request regarding the reproducing of the content data as above was received, there is a risk that the basic screen would be displayed at a time of switching content data despite of configuring the standby state. Therefore, the reproducing apparatus 100 will not perform any processing responding to the above repeated request for stopping even if the above repeated request for stopping has been received.

By not performing any processing responding to the above repeated request for stopping, the reproducing apparatus 100 can prevent more surely the possibly occurring issues in the existing content reproducing system. Any special description will be made hereinafter, however, the reproducing apparatus 100 according to the embodiment of the present invention can be set not to perform any processing responding to the request for stopping when the request for stopping has been received in the standby state St3.

Moreover, if the request for reproducing transmitted from the control apparatus 200 has been received before the first standby time has elapsed, the reproducing apparatus 100 reproduces the content data whose the state of reproducing has been maintained (that is, the content data that is currently set) again (S108).

When the request for switching content is received transmitted from the control apparatus 200 before the first standby time has elapsed, the reproducing apparatus 100 makes the first standby state St3_1 transition to the third standby state St3_3 (S110). Under the third standby state St3_3, the reproducing apparatus 100 sets prescribed standby time (the secondary standby time), such as for 5 seconds, for example, and further maintains the state of reproducing St2 until after the standby time has elapsed. In other words, the reproduction screen that has been displayed under the state of reproducing St2 is to be displayed on the display screen of the reproducing apparatus 100 under the first standby state St3_3. Hereinafter, the standby time that the reproducing apparatus 100 sets in the third standby state St3_3 may be referred to as "the third standby time".

When the request for reproducing transmitted from the control apparatus 200 is not received before the third standby time has elapsed, the reproducing apparatus 100 determines it as timeout and makes the third standby state St3_3 transition to the basic state St1 (S112). The above processing cancels maintaining the state of reproducing St1, and the basic screen will be displayed on the display screen of the reproducing apparatus 100. It is needless to mention that in a case where the communication with the server 300 has not normally been completed, such as a case where the server 300 does not store content data responding to the request for setting content, for example, the reproducing apparatus 100 can make the third standby state St3_3 transition to the basic state St1.

Moreover, when a request for reproducing transmitted from the control apparatus 200 is received before the third standby time has elapsed, the reproducing apparatus 100 sets, similar to step S100, content data to be reproduced based on the request for reproducing, and reproduces the set content data (s114). Therefore, the screen to be displayed on the display screen of the reproducing apparatus 100 is to be switched from the display screen with maintained display to a reproduction screen which displays an image indicated by the newly set content data.

If a request for stopping is received in the state of reproducing St2, the reproducing apparatus 100 performs processing described in steps S104 to S114, and makes the state related to reproducing content data selectively transition.

As shown in steps S104 to S114 in FIG. 3, the reproducing apparatus 100 makes the state related to reproducing content data transition to "the state of reproducing St2→the standby state St3→the state of reproducing St2", when switching content data to be reproduced. Therefore, the reproducing apparatus 100 can switch the content data to be reproduced without displaying the basic screen.

Figure 4:
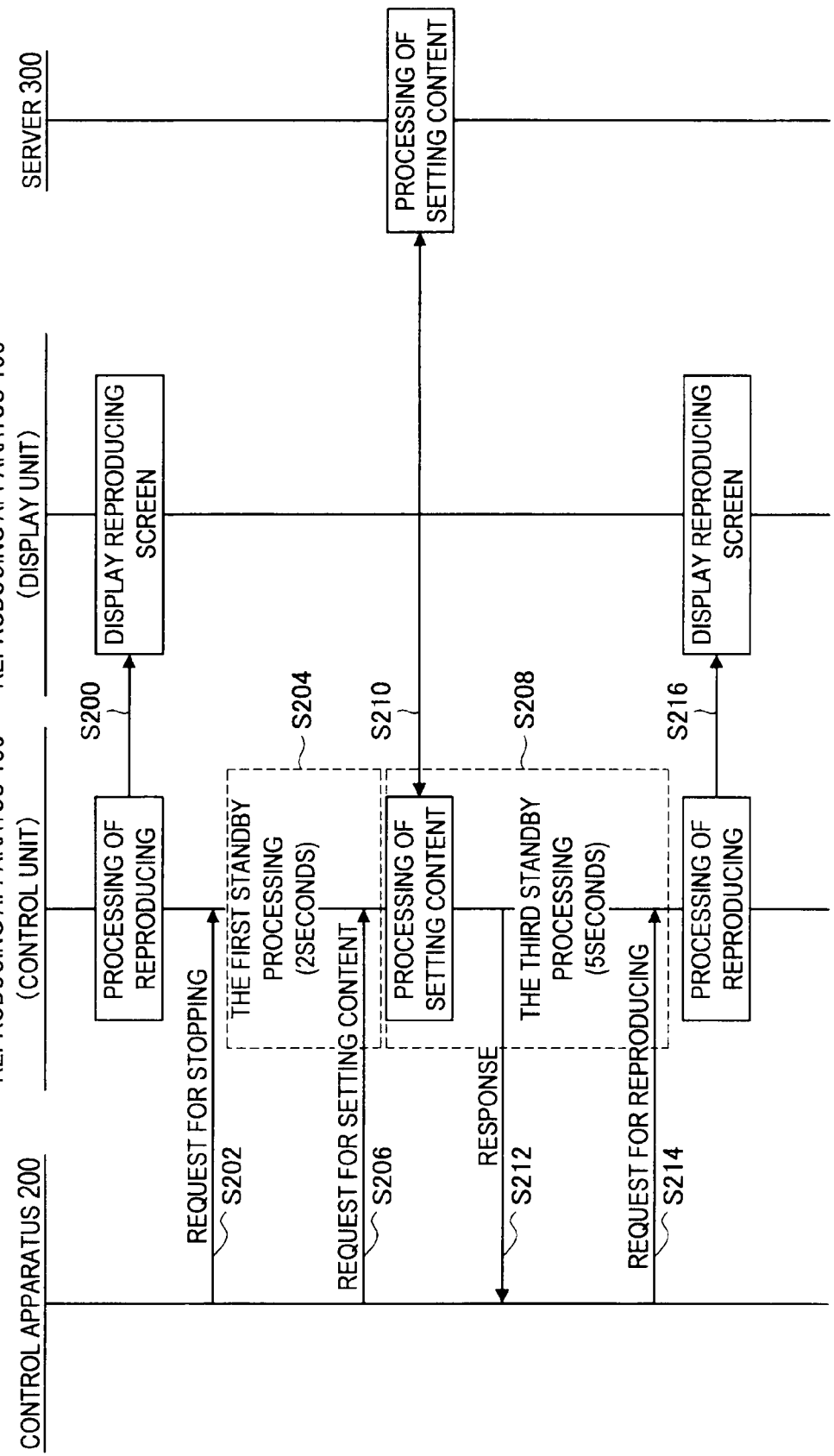
FIG. 4 is an explanatory diagram for illustrating an example of a processing related to switching content data to be reproduced in the reproducing apparatus according to the embodiment of the present invention.

Here, a detail explanation will be given on the processing related to switching content data to be reproduced in the existing reproducing apparatus 100. FIG. 4 is an explanatory diagram for illustrating an example of a processing related to switching content data to be reproduced in the reproducing apparatus 100 according to the embodiment of the present invention. FIG. 4 shows the control apparatus 200 and the server 300 which are configuring the content reproducing system 1000 that performs the processing in cooperation with the reproducing apparatus 100.

Moreover, FIG. 4 shows an example of a processing in a case where the reproducing apparatus 100 includes a control unit (later-described) that performs a processing responding to the request regarding the reproducing of the content data, and a display unit (later-described) that displays various screens. Moreover, FIG. 4 shows an example of a processing in a case where the reproducing apparatus 100 performs a processing of reproducing content data responding to a request for reproducing so as to display a reproduction screen (S200), that is, an example of a processing in a case where the reproducing apparatus 100 in the state of reproducing St2.

The control apparatus 200 transmits the request for stopping (S202). If the request for stopping transmitted from the control apparatus 200 in step S202, the reproducing apparatus 100 sets the first standby time to maintain the display of the reproduction screen for 2 seconds (an example of the first standby time) (S204).

Here, when the request for stopping transmitted from the control apparatus 200 is received in step S202, the reproducing apparatus 100 may notify the user of the reception of the request for stopping. Notifying the user of the reception of the request for stopping can make the user feel safe, which relieves the decreasing of user's inconvenience due to keeping the user waiting until after the first standby time has elapsed. Here, the reproducing apparatus 100 notifies, for example, by displaying that the request for stopping has been received on the display screen (a visual notification), or by outputting audio indicating that the request for stopping has been received (an auditory notification), however, the notification method according to the embodiment of the present invention is not limited to them. For example, the reproducing apparatus 100 may respond to the received request for stopping to the control apparatus 200, and may display the notification that the request for stopping has been received on the display screen of the control apparatus 200.

Any special description will be made hereinafter, however, when the request regarding the reproducing of the content data ready to be executed is received under the standby state St3, the reproducing apparatus 100 according to the embodiment of the present invention may notify the user that the request regarding the reproducing of the content data has been received.

The control apparatus 200 that has transmitted the request for stopping in step S202 transmits the request for setting content (S206). If the reproducing apparatus 100 receives the request for setting content transmitted from the control apparatus 200 in Step S206, the reproducing apparatus 100 sets the third standby time after the first standby time has elapsed, and further maintains the display of the reproduction screen for 5 seconds (an example of the third standby time) (S208).

The reproducing apparatus 100 communicates with the server 300 based on the received request for setting content, and sets the content data subject to be reproduced corresponding to the request for setting content (S210). When completed the setting of content data in step S210, the reproducing apparatus 100 transmits a respond indicating that the setting of content data has been completed (an example of a respond to a request for setting content) to the control apparatus 200 (S212).

When received the respond transmitted from the reproducing apparatus 100 in step S212, indicating that the setting of the content data has been completed, the control apparatus 200 transmits a request for reproducing (S214). When received the request for reproducing transmitted from the control apparatus 200 in step 214, the reproducing apparatus 100 reproduces the content data set in step S210 after the third standby time has elapsed (S216). Consequently, a reproduction screen indicating an image corresponding to the content data that has newly been set in step S210 will be displayed on the display screen of the reproducing apparatus 100.

In the content reproducing system 1000, the reproducing apparatus 100 performs the processing shown in FIG. 4, for example, in cooperation with the control apparatus 200 and the server 300 so that the reproduction screen displaying an image indicated by the reproduced content data will be switched into a reproduction screen displaying an image indicated by a newly set content data. Here, as shown in FIG. 4, the reproducing apparatus 100 does not display the basic screen at a time of switching content data to be reproduced. Therefore, the reproducing apparatus 100 performs the processing as shown in FIG. 4, for example, so as to facilitate the smooth switching of content data to be reproduced.

(IV) When Reproduction of Content Data Ends Under the State of Reproducing St2

Referring to the FIG. 3 again, an example of a state transition related to reproducing content data in the reproducing apparatus 100. When reproduction of the content data that is reproducing in the state of reproducing St2 is completed, the reproducing apparatus 100 makes the state of reproducing St2 transition to the second standby state St3_2 (S116). Under the second standby state St3_2, the reproducing apparatus 100 sets prescribed standby time (the primary standby time), such as for 4 seconds, for example, and maintains the state of reproducing St2 until after the standby time has elapsed. In other words, the reproduction screen that has been displayed under the state of reproducing St2 is to be displayed on the display screen of the reproducing apparatus 100 under the second standby state St3_2. Hereinafter, the standby time that the reproducing apparatus 100 sets in the second standby state St3_2 may be referred to as "the second standby time".

The reproducing apparatus 100 sets, for example, the second standby time (the primary standby time) to be set in the second standby state St3_2 longer than the first standby time (the primary standby time) to be set in the first standby state St3_1.

Here, when the control apparatus 200 transmits, for example, "a request for stopping→a request for setting content→a request for reproducing", there is no inevitability for the control apparatus 200 to set long for a time from transmitting of the request for stopping to transmitting of the request for setting content, so the standby time may be short. On the other hand, when the control apparatus 200 instructs the reproducing apparatus 100 to switch content data to be reproduced in the reproducing apparatus 100 after detected that the reproduction of content data has ended, the control apparatus 200 is supposed to start transmitting the request regarding the reproducing of the content data after detected the end of reproduction in the reproducing apparatus 100. Therefore, in order to further prevent decreasing of the user's inconvenience by further shortening the primary standby time, the reproducing apparatus 100 sets, for example, the second standby time to be set in the second standby state St3_2 longer than the first standby time to be set in the first standby state St3_1.

When the request regarding the reproducing of the content data transmitted from the control apparatus 200 before the second standby time has elapsed, the reproducing apparatus 100 determines it as timeout and makes the second standby state St3_2 transition to the basic state St1 (S106). The above processing cancels maintaining the state of reproducing St1, and the basic screen will be displayed on the display screen of the reproducing apparatus 100.

Moreover, if the request for reproducing transmitted from the control apparatus 200 has been received before the second standby time has elapsed, the reproducing apparatus 100 reproduces the content data whose the state of reproducing St1 has been maintained (that is, the content data that is currently set) again (S120).

Moreover, if the request for switching content transmitted from the control apparatus 200 has been received before the second standby time has elapsed, the reproducing apparatus 100 makes the second standby state St3_2 transition to the third standby state St3_3 (S122).

After step S122, the state related to reproducing content data in the reproducing apparatus 100 transitions to the third standby state St3_3, so the reproducing apparatus 100 performs the processing of S112 and S114 above. Therefore, in the reproducing apparatus 100, displaying the basic screen or reproducing the newly set content data is performed.

As shown in steps S116 to S122 in FIG. 3, step S112, and step S114, the reproducing apparatus 100 makes the state regarding reproducing content data transition to "the state of reproducing St2→the standby state St3→the state of reproducing St2", if switching content data to be reproduced when reproducing content data has ended. Therefore, the reproducing apparatus 100 can switch the content data to be reproduced without displaying the basic screen, even in a case where content data to be reproduced is to be switched at a time when reproducing content data has ended.

Figure 5:
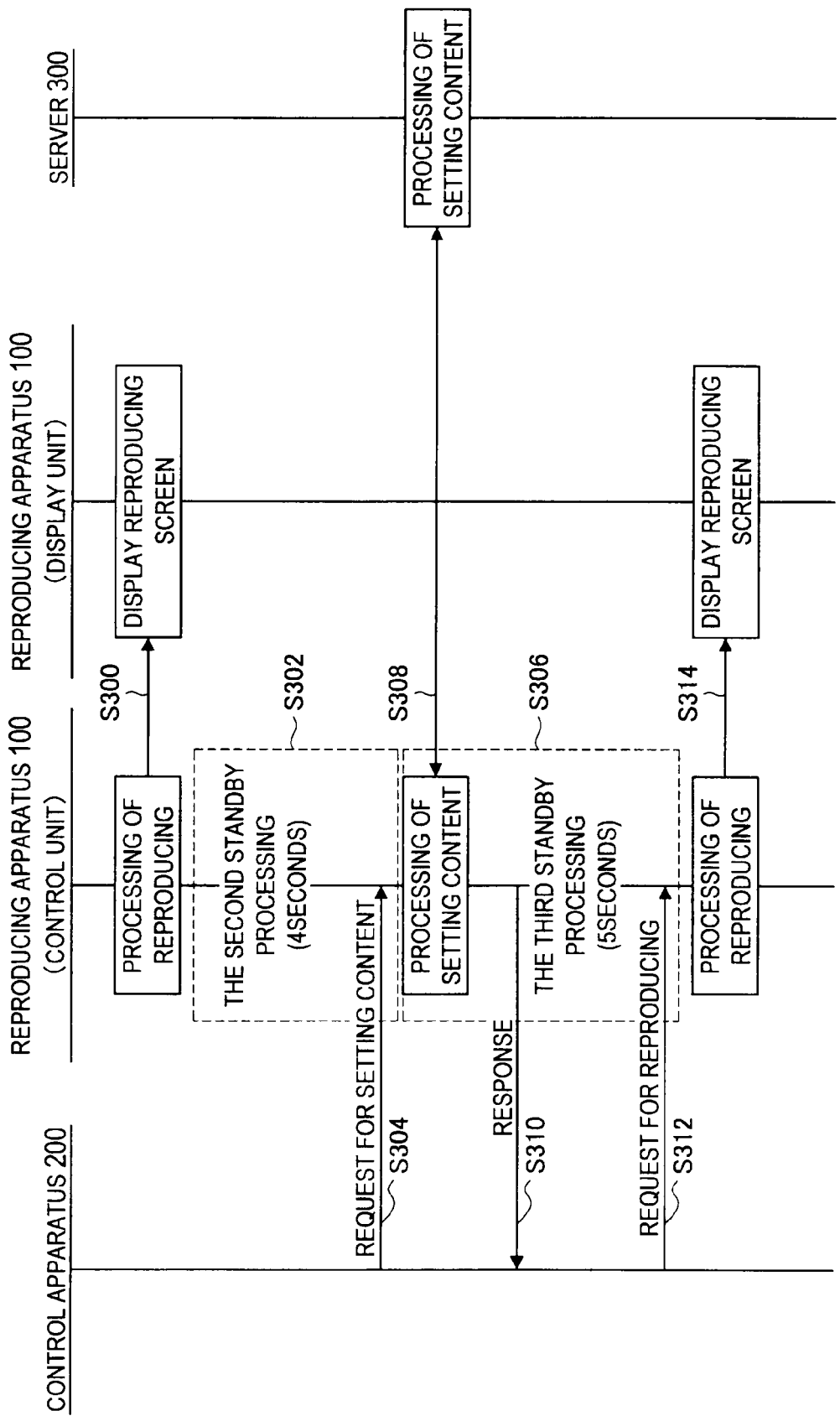
FIG. 5 is an explanatory diagram for illustrating an example of a processing related to switching content data to be reproduced when reproduction of the content data has ended in the reproducing apparatus according to the embodiment of the present invention.

Here, a concrete explanation will be given on a processing related to switching content data to be reproduced when reproduction of the content data has ended in the reproducing apparatus 100. FIG. 5 is an explanatory diagram for illustrating an example of a processing related to switching content data to be reproduced when reproduction of the content data has ended in the reproducing apparatus 100 according to the embodiment of the present invention. Similar to FIG. 4, FIG. 5 shows the control apparatus 200 and the server 300 which are configuring the content reproducing system 1000 that performs the processing in cooperation with the reproducing apparatus 100.

Moreover, similar to FIG. 4, FIG. 5 shows an example of a processing in a case where the reproducing apparatus 100 includes a control unit (later-described) that performs a processing responding to the request regarding the reproducing of the content data, and a display unit (later-described) that displays various screens. Moreover, similar to FIG. 4, FIG. 5 shows an example of a processing in a case where the reproducing apparatus 100 performs a processing of reproducing content data responding to a request for reproducing so as to display a reproduction screen (S300), that is, an example of a processing in a case where the reproducing apparatus 100 in the state of reproducing St2.

When the reproducing of the content data that is reproducing in step S300 ends, the reproducing apparatus 100 sets the second standby time to maintain the reproduction screen for 4 seconds (an example of the second standby time) (S302).

The control apparatus 200 transmits the request for setting content (S304). If the reproducing apparatus 100 receives the request for setting content transmitted from the control apparatus 200 in Step S304, the reproducing apparatus 100 sets the third standby time after the second standby time has elapsed, and further maintains the display of the reproduction screen for 5 seconds (an example of the second standby time) (S306).

The reproducing apparatus 100 communicates with the server 300 based on the received request for setting content, and sets the content data subject to be reproduced corresponding to the request for setting content (S308). When completed the setting of content data in step S308, the reproducing apparatus 100 transmits a respond indicating that the setting of content data has been completed (an example of a respond to a request for setting content) to the control apparatus 200 (S310).

When received the respond transmitted from the reproducing apparatus 100 in step S310, indicating that the setting of the content data has been completed, the control apparatus 200 transmits a request for reproducing (S312). When received the request for reproducing transmitted from the control apparatus 200 in step 312, the reproducing apparatus 100 reproduces the content data set in step S210 after the third standby time has elapsed (S314). Consequently, a reproduction screen indicating an image corresponding to the content data that has newly been set in step S308 will be displayed on the display screen of the reproducing apparatus 100.

In the content reproducing system 1000, the reproducing apparatus 100 performs the processing shown in FIG. 5, for example, in cooperation with the control apparatus 200 and the server 300 so that the reproduction screen displaying an image indicated by the reproduced content data will be switched into a reproduction screen displaying an image indicated by a newly set content data. Here, as shown in FIG. 5, the reproducing apparatus 100 does not display the basic screen at a time of switching content data to be reproduced. Therefore, the reproducing apparatus 100 performs a processing as shown in FIG. 5, for example, so as to facilitate the smooth switching of content data to be reproduced in a case where the reproduction of content data has ended.

The reproducing apparatus 100 performs a processing shown in FIG. 3, for example, so as to make the state related reproduction of content data selectively transition. The reproducing apparatus 100 sets the standby time with two stages: the primary standby time (the first standby time and the second standby time) and the secondary standby time (the third standby time), so as to switch the content data to be reproduced without displaying the basic screen while preventing the user's convenience from being decreased. Therefore, having the reproducing apparatus 100 that performs processing shown in FIG. 3 realizes a content reproducing system 1000 which is capable of facilitating the smooth switching of content data to be reproduced, and of preventing decreasing the user's inconvenience.

[2] The Second Example of Processing in the Reproducing Apparatus 100

If the reproducing apparatus 100 performs the processing shown in FIG. 3 as processing related to switching approach according to the embodiment of the present invention, it can switch the content data to be reproduced without displaying the basic screen while preventing decreasing of the user's inconvenience. However, the processing related to switching approach according to the embodiment of the present invention is not limited to the processing shown in FIG. 3. Next, an explanation will be given on another processing in the reproducing apparatus 100 regarding the switching approach according to the embodiment of the present invention.

Figure 6:
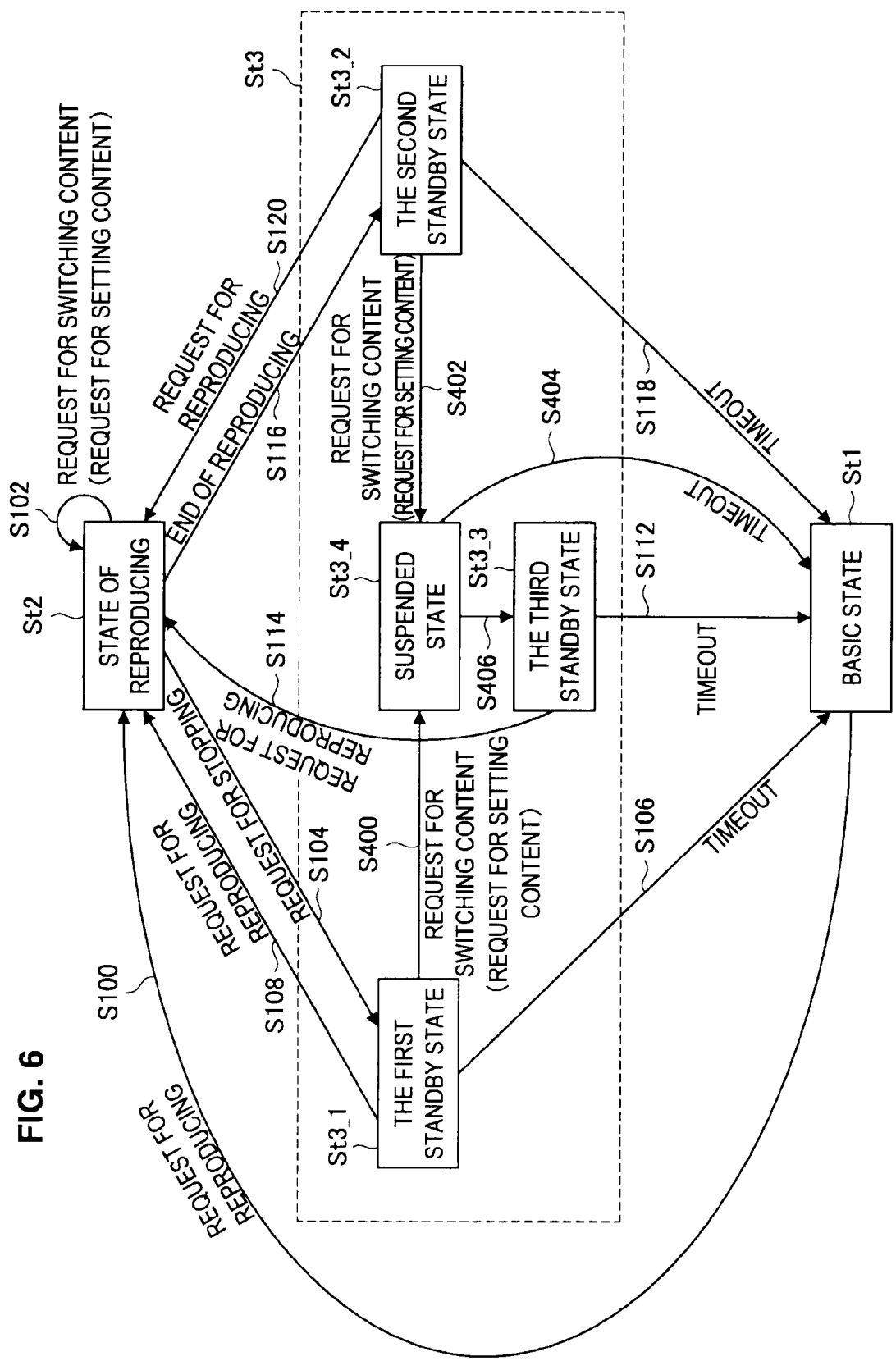
FIG. 6 is a state transition diagram for illustrating another example of a state transition related to reproducing content data in the reproducing apparatus according to the embodiment of the present invention.

FIG. 6 is a state transition diagram for illustrating another example of a state transition related to reproducing content data in the reproducing apparatus 100 according to the embodiment of the present invention. The reproducing apparatus 100 that performs processing shown in FIG. 6 includes, similar to the FIG. 3, the basic state St1, the state of reproducing St2, and the standby state St3, as states related to reproducing of content data.

Comparing FIG. 3 and FIG. 6, the reproducing apparatus 100 that performs processing shown in FIG. 6 makes the basic state St1, the state of reproducing St2, and the standby state St3 selectively transition by performing processing basically similar to the processing shown in FIG. 3. Further, comparing FIG. 3 and FIG. 6, it is clear that the standby state St3 shown in FIG. 6 is different on a point that it further has a suspended state St3_4. Here, the suspended state St3_4 is a standby state in which the reproducing apparatus 100 suspends the setting of the secondary standby time (the third standby time) until after the communication with the server 300 responding to the request for setting request that has been received.

As shown in step S210 in FIG. 4, for example, if the request for content setting is received, the reproducing apparatus 100 communicates with the server 300 based on the received request for setting content. Here, the communication between the reproducing apparatus 100 and the server 300 sometimes takes a certain amount of time, for example, due to a network delay, or a processing related to content data in the server 300 (for example, a processing for generating content data that is encoded using codec corresponded by the reproducing apparatus 100, or the like). For that reason, if, in a case where the communication responded to the received request for setting content with the server 300 has not been completed within the third standby time (the secondary standby time) that has been set in the third standby state St3_3, there is a risk that the basic screen will be displayed on the display screen due to timeout.

As shown in steps S212 and S214 in FIG. 4, for example, it is quite unlikely that once receiving the response to the request for setting content transmitted from the reproducing apparatus 100, the control apparatus 200 will not perform any processing. It is assumed that the control apparatus 200 will transmit a request for reproducing. In other words, if the suspended state has been maintained until after transmitting of the respond that is indicated in step S212 in FIG. 4, for example, there is a risk that the waiting time of the user of the control apparatus 200 (the first standby time+suspended time+the second standby time) would be unnecessarily prolonged, which would lead to decrease the user's convenience.

Subsequently, when received the request for switching content before the primary standby time (the first standby time, the second standby time), which were set in the first standby state or the second standby state, has elapsed, the reproducing apparatus 100 makes the state transition related to reproducing content data transition to the suspended state St3_4. Then, the reproducing apparatus 100 makes the suspended state St3_4 transition to the third standby state St3_3, at a time of transmitting the response to the request for setting content to the control apparatus 200 after ended the communication responding to the received request for setting content with the server 300. This enables the reproducing apparatus 100 to further facilitate a smooth switching content data to be reproduced and to further prevent the user's convenience from being decreased, better than performing processing shown in FIG. 3.

More specifically, when received the request for switching content before the primary standby time (the first standby time, the second standby time), which were set in the first standby state or the second standby state, has elapsed, the reproducing apparatus 100 makes the state transition related to reproducing content data transition to the suspended state St3_4 (S400, S402). Consequently, even if received the request for switching content before the primary standby time, which were set in the first standby state or the second standby state, has elapsed, the reproducing apparatus 100 will not set the secondary standby time.

Moreover, if the request for switching content has been received before the primary standby time, which were set in the first standby state or the second standby state, has elapsed, the reproducing apparatus 100 communicates with the server 300 based on the request for setting content that has been received. Here, if there is no response from the server 300 after a certain period of time has elapsed since started a communication with the server 300, for example, the reproducing apparatus 100 determines it as a time out, and makes the suspended state St3_4 transition to the basic state St1 (S404). Note that it is needless to mention that in a case where the communication with the server 300 has not normally been completed, such as a case where the server 300 does not store content data responding to the request for setting content, for example, the reproducing apparatus 100 can make the suspended state St3_4 transition to the basic state St1.

If the communication with the server 300 has ended and the content data to be reproduced, which is corresponding to the request for setting content, has been set, the reproducing apparatus 100 makes the suspended state St3_4 transition to the third standby state St3_3 at a time of transmitting the response to the control apparatus 200, for example (S406).

After step S406, the state related to reproducing content data in the reproducing apparatus 100 transitions to the third standby state St3_3, so the reproducing apparatus 100 performs processing similar to those of S112 and S114 shown in FIG. 3. Therefore, in the reproducing apparatus 100, displaying the basic screen or reproducing the newly set content data is performed.

The reproducing apparatus 100 that performs processing shown in FIG. 6 performs processing basically similar to those shown in FIG. 3, and makes the basic state St1, the state of reproducing St2, and the standby state St3 selectively transition. Therefore, the reproducing apparatus 100 can switch the content data to be reproduced without displaying the basic screen, in a case where content data to be reproduced is to be switched.

Moreover, when received the request for switching content before the primary standby time, which were set in the first standby state or the second standby state, has elapsed, the reproducing apparatus 100 makes the state related to reproducing content data transition to the suspended state St3_4. Then, the reproducing apparatus 100 makes the suspended state St3_4 transition to the third standby state St3_3, at a time of transmitting the response to the request for setting content to the control apparatus 200. This enables the reproducing apparatus 100 to further facilitate a smooth switching content data to be reproduced and to further prevent the user's convenience from being decreased, better than performing processing shown in FIG. 3.

Figure 7:
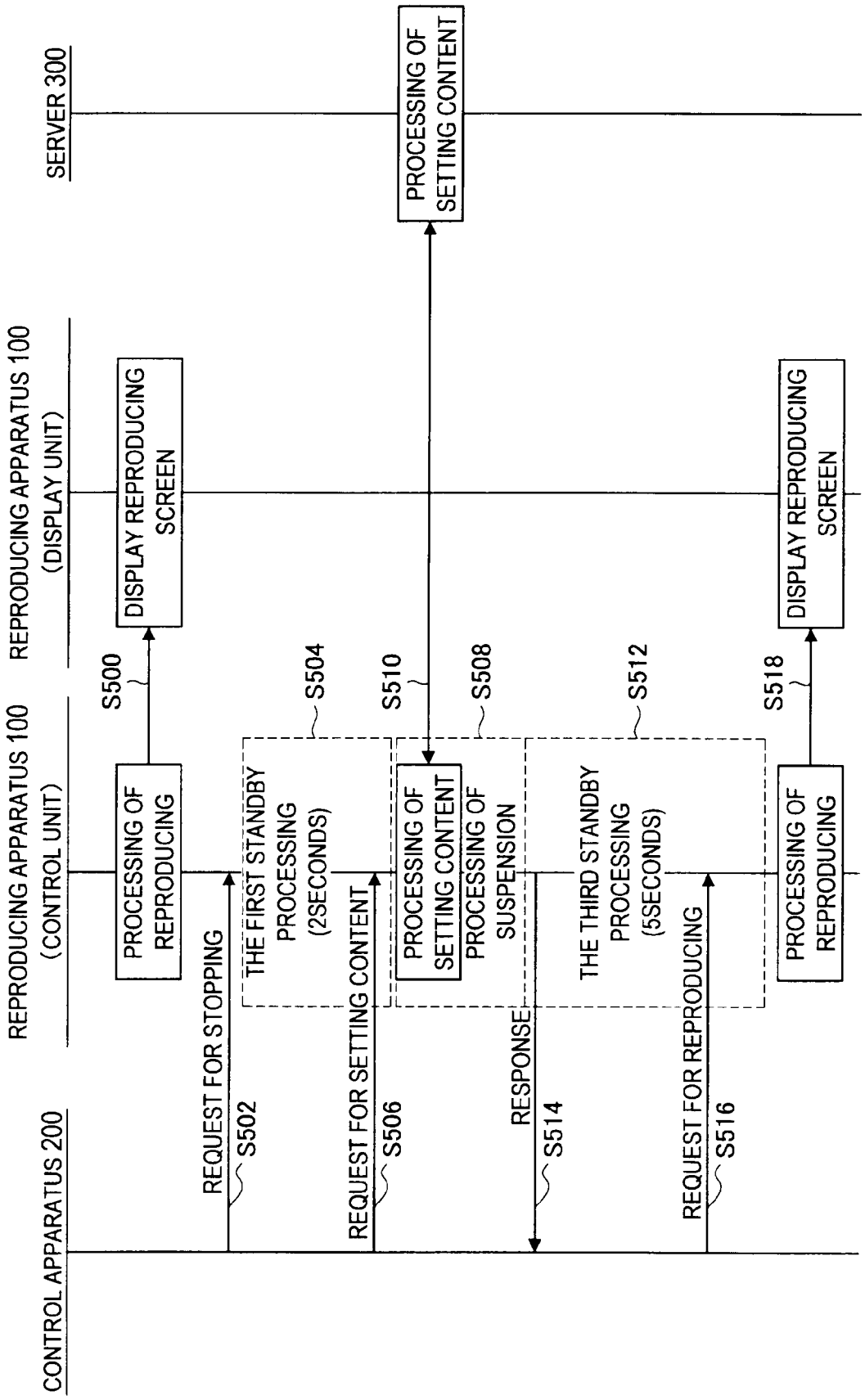
FIG. 7 is an explanatory diagram for illustrating another example of a processing related to switching content data to be reproduced in the reproducing apparatus according to the embodiment of the present invention.

Here, more concrete explanation will be given on a processing related to switching content data to be reproduced in the reproducing apparatus 100 that performs processing shown in FIG. 6. FIG. 7 is an explanatory diagram for illustrating another example of a processing related to switching content data to be reproduced in the reproducing apparatus 100 according to the embodiment of the present invention. Similar to FIG. 4, FIG. 7 shows the control apparatus 200 and the server 300 which are configuring the content reproducing system 1000 that performs the processing in cooperation with the reproducing apparatus 100.

Moreover, similar to FIG. 4, FIG. 7 shows an example of a processing in a case where the reproducing apparatus 100 includes a control unit (later-described) that performs a processing responding to the request regarding the reproducing of the content data, and a display unit (later-described) that displays various screens. Moreover, similar to FIG. 4, FIG. 7 shows an example of a processing in a case where the reproducing apparatus 100 performs a processing of reproducing content data responding to a request for reproducing so as to display a reproduction screen (S500), that is, an example of a processing in a case where the reproducing apparatus 100 in the state of reproducing St2.

The control apparatus 200 transmits the request for stopping (S502). If received the request for stopping transmitted from the control apparatus 200 in Step S502, the reproducing apparatus 100 sets the first standby time to maintain the display of the reproduction screen for 2 seconds (an example of the first standby time) (S504).

The control apparatus 200 that has transmitted the request for stopping in step S502 transmits the request for setting content (S506). If received the request for setting content transmitted from the control apparatus 200 in Step S506, the reproducing apparatus 100 suspends the setting of the third standby time to be set after the first standby time has elapsed (S508). And the reproducing apparatus 100 maintains the display of the reproduction screen that is displayed on the display screen of the reproducing apparatus 100.

The reproducing apparatus 100 communicates with the server 300 based on the received request for setting content, and sets the content data subject to be reproduced corresponding to the request for setting content (S510). When completed the setting of content data in step S510, the reproducing apparatus 100 cancels the suspended state of step S508 to set the third standby time, and further maintains the display of the reproduction screen for 5 seconds (an example of the third standby time) (S512). Moreover, when completed the setting content data in step S510, the reproducing apparatus 100 transmits a response indicating that the setting of the content data has been completed (an example of the response to the request for setting content) to the control apparatus 200 (S514). Note that the reproducing apparatus 100 may perform a processing in step S512 when performing a transmitting the response in step S514 (such as, right before, right after, or at the same time with the transmitting the response)

When received the response transmitted from the reproducing apparatus 100 in step S514, indicating that the setting of the content data has been completed, the control apparatus 200 transmits a request for reproducing (S516). When received the request for reproducing transmitted from the control apparatus 200 in step S16, the reproducing apparatus 100 reproduces the content data set in step S510 after the third standby time has elapsed (S518). Consequently, a reproduction screen indicating an image corresponding to the content data that has newly been set in step S510 will be displayed on the display screen of the reproducing apparatus 100.

In the content reproducing system 1000, the reproducing apparatus 100 performs the processing shown in FIG. 7, for example, in cooperation with the control apparatus 200 and the server 300 so that the reproduction screen displaying an image indicated by the reproduced content data will be switched into a reproduction screen displaying an image indicated by a newly set content data. Here, as shown in FIG. 7, the reproducing apparatus 100 does not display the basic screen at a time of switching content data to be reproduced. Therefore, the reproducing apparatus 100 performs a processing as shown in FIG. 7, for example, so as to facilitate the smooth switching of content data to be reproduced.

Moreover, the reproducing apparatus 100 does not set, as shown in steps S508 and S512 in FIG. 7, the third standby time (the secondary standby time) before the communication with the server 300 in step S510 has completed setting of the content data. Therefore, if, in a case where the communication responding to the request for setting content with the server 300 has not been completed within the third standby time, the reproducing apparatus 100 would not display the basic screen in the display screen due to timeout. Therefore, the reproducing apparatus 100 can further facilitate the smooth switching of the content data to be reproduced by performing the processing shown in FIG. 7 better than performing processing shown in FIG. 4.

The reproducing apparatus 100 performs a processing shown in FIG. 6, for example, so as to make the state related reproduction of content data selectively transition. The reproducing apparatus 100 configures, similar to the case where performing the processing shown in FIG. 3, the standby time with two stages: the primary standby time (the first standby time and the second standby time) and the secondary standby time (the third standby time), so as to switch the content data to be reproduced without displaying the basic screen while preventing the user's convenience from being decreased. Therefore, having the reproducing apparatus 100 that performs processing shown in FIG. 6 realizes a content reproducing system which is capable of facilitating the smooth switching of content data to be reproduced, and of preventing the user's inconvenience being decreased.

(Reproducing Apparatus According to the Present Invention)

The reproducing apparatus 100 performs processing shown in FIG. 3 or FIG. 6, for example, to realize the switching approach according to the embodiment of the present invention. Next, an explanation will be given on a configuration of the reproducing apparatus 100, which is capable of performing a processing related to the approach for switching described above according to the embodiment of the present invention. Note that hereinafter the explanation will be given with an example of a case where reproducing content data makes an image indicated by content data displayed on the display screen.

Figure 8:
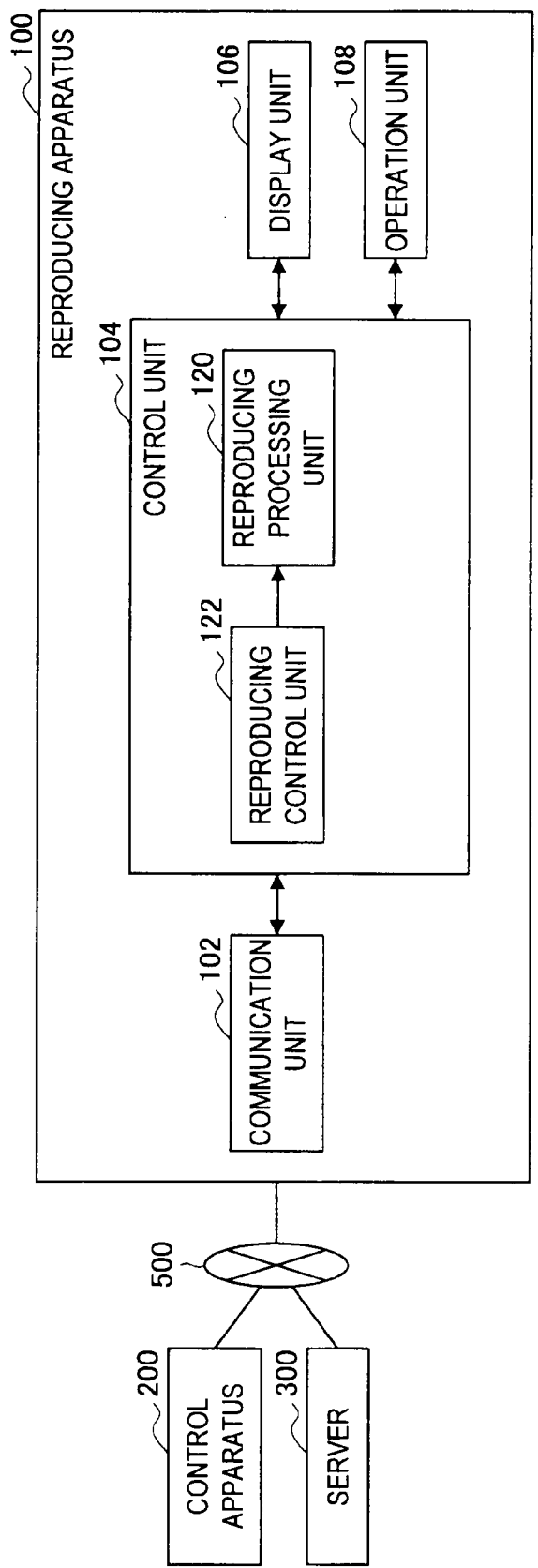
FIG. 8 is a block diagram for illustrating an example of configuration of the reproducing apparatus according to the embodiment of the present invention.

FIG. 8 is a block diagram for illustrating an example of configuration of the reproducing apparatus 100 according to the embodiment of the present invention. FIG. 8 shows the control apparatus 200 and the server 300 which are connected by the network 500 in cooperation with the reproducing apparatus 100. Note that the content reproducing system 1000 according to the embodiment of the present invention may have a configuration in which each of the reproducing apparatus 100, the control apparatus 200, and the server 300 communicate with each other respectively via the network 500 or directly. Moreover, in the content reproducing system 1000 according to the embodiment of the present invention, the control apparatus 200 and the server 300 may be, for example, configured by one apparatus.

Here, the server 300 stores content data, and transmits the content data to an external apparatus such as the reproducing apparatus 100 via the network 500 to instruct the external apparatus to reproduce the content data. When the content reproducing system 1000 complies with the DLNA standard, the server 300 takes a role of the DMS.

Moreover, the control apparatus 200 transmits the request regarding the reproducing of the content data to the reproducing apparatus 100, and externally controls processing regarding the reproducing of the content data in the reproducing apparatus 100 in remote from the reproducing apparatus 100. When the content reproducing system 1000 complies with the DLNA standard, the control apparatus 200 takes a role of the DMC.

Moreover, the reproducing apparatus 100 locally reproduces content data obtained from the server 300 via the network 500 based on the request regarding the reproducing of the content data transmitted from the control apparatus 200. When the content reproducing system 1000 complies with the DLNA standard, the reproducing apparatus 100 takes a role of the DMR.

The network 500 may be a wired network such as LAN (Local Area Network) or WAN (Wide Area Network), a wireless network such as a wireless WAN (WWAN; Wireless Wide Area Network) or a wireless MAN (WMAN; Wireless Metropolitan Area Network) via a base station, Internet using a communication protocol such as TCP/IP (Transmission Control Protocol/Internet Protocol) or the like, for example.

With reference to FIG. 8, the reproducing apparatus 100 includes a communication unit 102, a control unit 104, a display unit 106, and an operation unit 108.

Further, the reproducing apparatus 100 may include a ROM (Read Only Memory; not shown), RAM (Random Access Memory; not shown), a storage unit (not shown), or the like. The reproducing apparatus 100 connects the components to each other by a bus as a channel for data, for example.

The ROM (not shown) is provided for storing data for control, such as programs, operating parameters, etc. to be used by the control unit 104. The RAM (not shown) is provided for temporarily storing programs to be executed by the control unit 104. The storage unit (not shown) is a tool for storing included in the reproducing apparatus 100, and various data may be stored therein, such as content data, applications, etc. As an example of the storage unit (not shown), there is a later-described recording medium.

[An Example of a Hardware Configuration of the Reproducing Apparatus 100]

Figure 9:
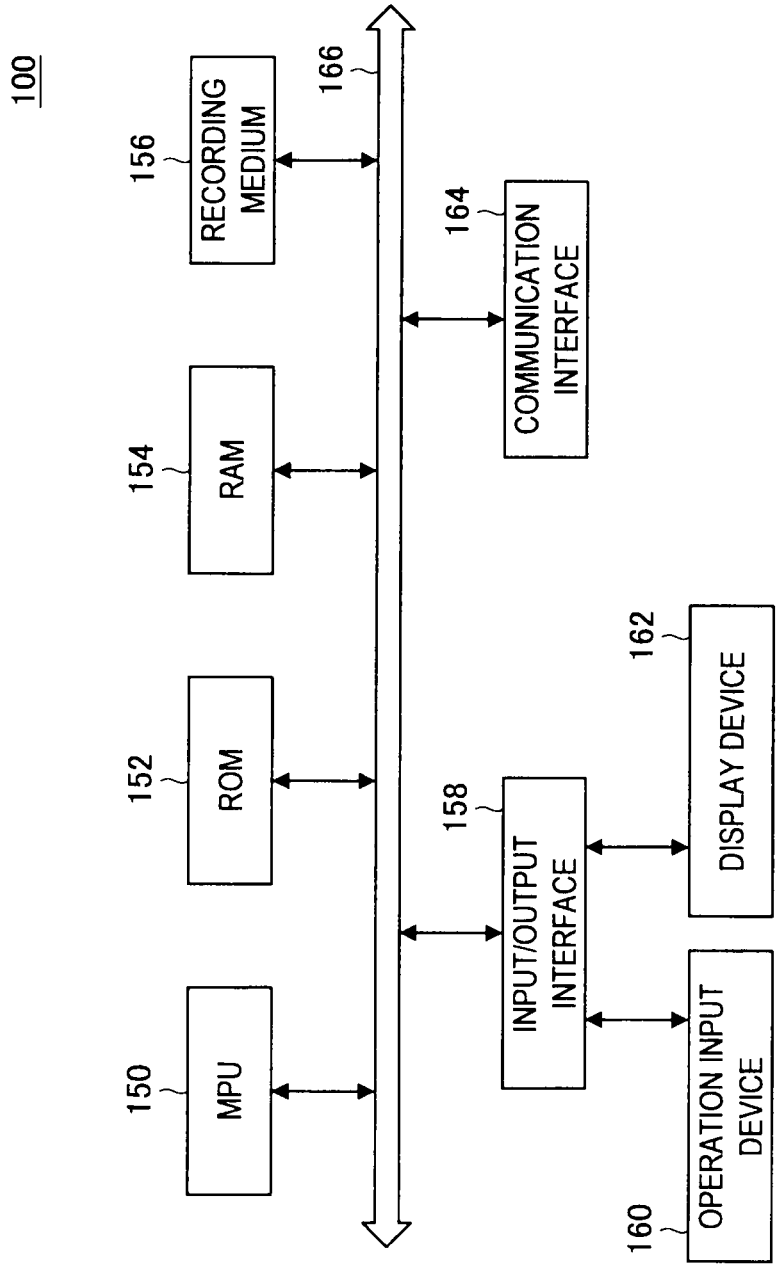
FIG. 9 is an explanatory diagram for illustrating an example of hardware configuration of the reproducing apparatus according to the embodiment of the present invention.

FIG. 9 is an explanatory diagram for illustrating an example of hardware configuration of the reproducing apparatus 100 according to the embodiment of the present invention. The reproducing apparatus 100 has a MPU 150, a ROM 152, a RAM 154, a recording medium 156, an input/output interface 158, an operation input device 160, a display device 162, and a communication interface 164. The reproducing apparatus 100 connects the components to each other by a bus 166 as a channel for data, for example.

The MPU 150 includes an MPU (Micro Processing Unit), an integrated circuit with multiple circuits integrated for implementing control functions, etc. And it functions as the control unit 104 for controlling the entire reproducing apparatus 100. Additionally, in the reproducing apparatus 100, the MPU 150 may take roles of a reproducing processing unit 120 and a reproducing control unit 122, which are to be described later.

The ROM 152 is provided for storing data for control, such as programs, operating parameters, etc. to be used by the MPU 150, and the RAM 154 is provided for temporarily storing programs to be executed by the MPU150, for example.

The recording medium 156 functions as the storage unit (not shown), and various data is stored therein, for example, content data, applications, etc. The recording medium 156 may be a magnetic recording medium, such as a hard disk, or a non-volatile memory, such as an EEPROM (Electrically Erasable and Programmable Read Only Memory), a flash memory, an MRAM (Magnetoresistive Random Access Memory), an FeRAM (Ferroelectric Random Access Memory), or a PRAM (Phase change Random Access Memory), for example. Further, the reproducing apparatus 100 can include the recording medium 156 attachable/detachable to/from the reproducing apparatus 100.

The input/output interface 158 connects with the operation input device 160 and the display device 162, for example. The operation input device 160 functions as the operation unit 106, and the display device 162 functions as the display unit 108. The input/output interface 158 may be a USB (Universal Serial Bus) terminal, a DVI (Digital Visual Interface) terminal, a HDMI (High-Definition Multimedia Interface) terminal and various processing circuits, for example. The operation input device 160 is provided in the reproducing apparatus 100, for example, and is connected to the input/output interface 158 inside the reproducing apparatus 100. The operation input device 160 may be but is not limited to a rotary selector such as button, directional key or jog dial, or a combination thereof. The display device 162 is provided in the reproducing apparatus 100, for example, and is connected to the input/output interface 158 inside the reproducing apparatus 100. The display device 162 may be but is not limited to a liquid crystal display (LCD) or organic electroluminescence display (or referred to as OLED display (Organic Light Emitting Diode display)). Of course, the input/output interface 158 can connect with an operation input device (such as keyboard or mouse) or display device (such as external display) as an external device of the reproducing apparatus 100. Moreover, the display device 162 may be a device capable of displaying and performing user operations, such as a touch screen, or the like.

The communication interface 164 is a communication tool provided in the reproducing apparatus 100, and functions as the communication unit 102 for making a wired/wireless communication with an external device such as the control apparatus 200 or the server 300 via the network (or directly).

The communication interface 164 may be communication antenna and RF circuit (wireless communication), IEEE802.15.1 port and exchange circuit (wireless communication), IEEE802.11b port and exchange circuit (wireless communication), or LAN terminal and exchange circuit (wired communication).

The reproducing apparatus 100 can perform the processing of the switching approach according to the embodiment of the present invention with the configuration shown in FIG. 9, for example. The hardware configuration of the reproducing apparatus 100 according to the embodiment of the present invention is not limited to the configuration shown in FIG. 9. For example, when the reproducing apparatus 100 may include a timer which is configured from an oscillator, or the like separately. The above timer is used, for example, to determine whether each of the standby time has elapsed.

Further, the reproducing apparatus 100 may include an audio output device composed of a DSP (Digital Signal Processor), an amplifier, a speaker or the like, for example. By having the above DSP or the audio output device, the reproducing apparatus 100 can send an audio notification to the user notifying that the request regarding the reproducing of the content data has been received, when received the request regarding the reproducing of the content data transmitted from the control apparatus 200 in the standby state.

With reference to FIG. 8 again, the components of the reproducing apparatus 100 will be described. The communication unit 102 is a communication tool provided in the reproducing apparatus 100 and performs a wired/wireless communication with an external device such as the control apparatus 200 or the server 300 via the network (or directly). The communication unit 102 is controlled in its communication by the control unit 104, for example.

The communication unit 102 may be but is not limited to communication antenna and RF circuit, or LAN terminal and exchange circuit, for example. For example, the communication unit 102 can have an arbitrary configuration capable of communicating with an external device via the network.

The control unit 104 is configured with a MPU or an integrated circuit in which various processing circuits are integrated, for example, and serves to entirely control the reproducing apparatus 100. The control unit 104 includes the reproducing processing unit 120 and the reproducing control unit 122, and takes a leading role of performing processing regarding the switching approach according to the embodiment of the present invention. The control unit 104 may include a communication control unit (not shown) for controlling communication with the external apparatus via the communication unit 102.

The reproducing processing unit 120 performs a processing related to the reproduction of content data responding to the request regarding the reproducing of the content data received by the communication unit 102. Further, execution of the processing in the reproducing processing unit 120 is to be controlled by the reproducing control unit 122.

The reproducing control unit 122 controls an execution condition of the processing related to the production of the content data in the reproducing processing unit 120.

More specifically, if received the request for stopping while the reproducing processing unit 120 has been under the state of reproducing, or if ended the reproduction of the content data while being the state of reproducing, for example, the reproducing control unit 122 sets the primary standby time to maintain the state of reproducing in the reproducing processing unit 120 until after the primary standby time has elapsed. Therefore, the state related to the reproduction of the content data in the reproducing apparatus 100 transitions from the state of reproducing St2 to the first standby state St3_1 or the second standby state St3_2. The display of the reproduction screen is to be maintained on the display screen of the display unit 106.

If received the request for setting content before the primary standby time has elapsed, for example, the reproducing control unit 122 further sets the secondary standby time after the primary standby time has elapsed to maintain the state of reproducing in the reproducing processing unit 120 until after the secondary standby time has elapsed. Therefore, the state related to the reproduction of the content data in the reproducing apparatus 100 transitions from the first standby state St3_1 or the second standby state St3_2 to the third standby state St3_3. The display of the reproduction screen is to be maintained on the display screen of the display unit 106.

Further, if received the request for reproducing before the secondary standby time has elapsed, the reproducing control unit 122 instructs the reproducing processing unit 120 to reproduce content data that has been newly set responding the request for setting content. Therefore, the display screen of the display unit 106 displays a reproduction screen corresponding to the newly set content data, which has been switched from the maintained reproduction screen.

Further, if not received the request for setting content before the primary standby time has elapsed, or if not received the request for reproducing before the secondary standby time has elapsed, for example, the reproducing control unit 122 makes the execution state of the processing related to the reproduction of the content data in the reproducing processing unit 120 transition from the state of reproducing to the basic state. Therefore, the state regarding the reproduction of the content data in the reproducing apparatus 100 transitions from the third standby state St3_3 to the basic state St1, and the display screen of the display unit 106 displays the basic screen.

The reproducing control unit 122 controls the execution state of the processing related to the production of the content data in the reproducing processing unit 120 as described above, for example, to control the processing related to switching content data to be reproduced.

Note that the processing related to the control in the reproducing control unit 122 is not limited to the description above. For example, if received the request for stopping before the primary standby time or the secondary standby time has elapsed, the reproducing control unit 122 does not allow the reproducing processing unit 120 to perform the processing responding to the request for stopping. Moreover, if received the request for setting content before the primary standby time has elapsed, or if received the request for reproducing before the secondary standby time has elapsed, for example, the reproducing control unit 122 performs a processing to make the user notified that the request related to the reproducing of the content data has been received. That is, the reproducing control unit 122 takes a leading role of performing the processing related to the reproducing of the content data shown in FIG. 3 or FIG. 6 as described above.

The reproducing control unit 122 controls the execution state of the processing in the reproducing processing unit 120 as described above. If the reproducing control unit 122 controls the execution state of the processing in the reproducing processing unit 120, then the processing related to the reproducing of the content data shown in FIG. 3 or FIG. 6 as described above can be realized in the reproducing apparatus 100 (a processing regarding the switching approach according to the embodiment of the present invention).

The control unit 104 includes the reproducing processing unit 120 and the reproducing control unit 122 and thus can serve to mainly perform the processing related to the switching approach according to the embodiment of the present invention. It is needless to mention that the configuration of the control unit 104 provided in the reproduction apparatus 100 according to the embodiment of the present invention is not limited to the above.

The display unit 106 is a display tool provided in the information processing apparatus 100 and displays various pieces of information on the display screen. The screen to be displayed on the display screen of the display unit 106 includes the basic screen, the reproducing screen corresponding to the content data, and other operation screens for causing the reproducing apparatus 100 to perform a desired operation, for example. The display unit 106 includes but is not limited to LCD or organic EL display. For example, the display unit 106 can be configured with a touch screen in the reproducing apparatus 100, for example. In the above case, the display unit 106 functions as the operation display unit capable of both of the user's operation and the displaying.

The operation unit 108 is an operation means provided in the reproducing apparatus 100 which enables the user's operation. The reproducing apparatus 100 includes the operation unit 108, thereby enabling the user's operation and performing a user-desired processing in response to the user's operation. The operation unit 108 includes a rotary selector such as button, directional key or jog dial, or a combination thereof.

The reproducing apparatus 100 can realize a processing related to the switching approach according to the embodiment of the present invention.

As described above, the content reproducing system 1000 according to the embodiment of the present invention includes the reproducing apparatus 100, the control apparatus 200 that transmits a request regarding the reproducing of content data, and the server 300 that stores the content data. If received the request for stopping under the state of reproducing, or if the reproducing of content data is completed under the state of reproducing, the reproducing apparatus 100 sets a standby time with two stages: the primary standby time (the first standby time, the second standby time) and the secondary standby time (the third standby time) to maintain the state of reproducing.

Here, if not received the request for setting content being set before the primary standby time has elapsed, the reproducing apparatus 100 cancels the maintaining of the state of reproducing and makes the state transition related to reproducing content data transition from the state of reproducing to the basic state in which the content data is not producing. Therefore, since a user of the control apparatus 200 only needs to wait for the primary standby time even when the user wants to stop the reproduction of the content data, it is possible to prevent the user's convenience from being decreased. Further, if received the request for setting content before the primary standby time has elapsed, the reproducing apparatus 100 sets the secondary standby time after the primary standby time has elapsed (corresponding to the extension of the standby time), and further maintains the state of reproducing. Moreover, if received the request for reproducing content data being set before the secondary standby time has elapsed, the reproducing apparatus 100 reproduces the content data being set responding to the request for reproducing. Consequently, the state regarding reproducing of the content data in the reproducing apparatus 100 is not to be transitioned from the state of reproducing to the basic state, and so the reproducing apparatus 100 can switch the content data to be reproduced without displaying the basic screen on the display screen. In other words, the reproducing apparatus 100 can prevent the possibly occurring issues in the existing content reproducing system. Moreover, if the request for reproducing content data being set has not been received before the secondary standby time has elapsed, the reproducing apparatus 100 cancels the maintaining of the state of reproducing and makes the state transition related to reproducing content data transition from the state of reproducing to the basic state. Therefore, in the reproducing apparatus 100, if not received the request regarding reproducing of the content data transmitted from the control apparatus 200 when the two stages of standby time have elapsed, there is no possibility that maintaining the state of reproducing causes an event where a display of the display screen will not be back to the base screen from the reproduction screen (an event to decrease the user's convenience).

Therefore, having the reproducing apparatus 100 facilitates the smooth switching of the content data to be reproduced, and to realize the content reproducing system 1000 that is capable of preventing the user's convenience from being decreased.

Since the DLNA standard does not define uniquely a method for reproducing continuously content data, there is a possibility that the control apparatus 200 may transmit requests regarding the reproducing of the content data in various patterns. Here, in the reproducing apparatus 100, the reproducing control unit 122 does not allow the reproducing processing unit 120 to perform processing responding to the request for stopping if received the request for stopping before the primary standby time has elapsed or before the secondary standby time has elapsed. Therefore, the reproducing apparatus 100 can prevent displaying of the basic screen even if the request regarding the reproducing of content data has been transmitted in various patterns at a time of switching the content data to be reproduced. Consequently, the reproducing apparatus 100 can facilitate a further smooth switching of the content data to be reproduced.

Moreover, the reproducing apparatus 100 sets the secondary standby time (the third standby time), for example, longer than the primary standby time (the first standby time, the second standby time). The reproducing apparatus 100 sets the primary standby time to be set in the second standby state (the second standby time), for example, longer than the primary standby time to be set in the first standby state (the first standby time). As described above, by changing standby time according to the state regarding the reproducing of the content data of the reproducing apparatus 100 or to the received request regarding the reproducing of the content data, the reproducing apparatus 100 can shorten the user's standby time even when it is difficult to distinguish between the request for stopping related to switching the content and the request for stopping for stopping the reproduction. Therefore, the reproducing apparatus 100 can further prevent the user's convenience from being decreased.

Moreover, if received the request regarding the reproducing of the content data executable under the standby state, for example, the reproducing apparatus 100 notifies the user that the request regarding the reproducing of the content data has been received. Therefore, the reproducing apparatus 100 can make the user feel safe, which further prevents the user's inconvenience from being decreased.

Further, the reproducing apparatus 100 may not set the secondary standby time (the third standby time) until the content data has been set by communication with the server 300 responded to the received request for setting content, for example. Here, the communication between the reproducing apparatus 100 and the server 300 may take a certain amount of time due to a network delay, or a processing related to content data in the server 300, for example. For that reason, if, in a case where the communication responded to the received request for setting content with the server 300 is not completed within the secondary standby time being set, there is a risk that the basic screen will be displayed on the display screen due to timeout. As described above, by suspending setting the secondary standby time, the reproducing apparatus 100 can further facilitate a smooth switching of the content data to be reproduced.

As described above, the reproducing apparatus 100 has been explained as a constituent element that constitutes the content reproducing system 1000 according to the embodiment of the present invention, however, the embodiment of the present invention is not limited to such configuration. The embodiment of the present invention can be implemented to various apparatuses, for example, a television set that receives television broadcasting, a portable communication apparatus, such as a PC, a PDA (Personal digital Assistant), a computer such as a server, a cellular phone, a PHS (Personal Handyphone System), a video/music reproducing apparatus, a video/music recording/reproducing apparatus, a portable game machine, or the like.

Further, as described above, the control apparatus 200 has been explained as a constituent element that constitutes the content reproducing system 1000 according to the embodiment of the present invention, however, the embodiment of the present invention is not limited to such configuration. The embodiment of the present invention can be implemented to various apparatuses which are capable of transmitting a request regarding the reproducing of the content data according to the embodiment of the present invention, for example, a television set that receives television broadcasting, a portable communication apparatus, such as a PC, a PDA (Personal digital Assistant), a computer such as a server, a cellular phone, a PHS (Personal Handyphone System), a video/music reproducing apparatus, a video/music recording/reproducing apparatus, a portable game machine, or the like.

Further, as described above, the server 300 has been explained as a constituent element that constitutes the content reproducing system 1000 according to the embodiment of the present invention, however, the embodiment of the present invention is not limited to such configuration. The embodiment of the present invention can be implemented to various apparatuses, for example, a computer such as a PC or a server, a video/music reproducing apparatus, a video/music recording/reproducing apparatus, or the like A Program According to the Embodiment of the Present Invention A program for causing a computer to function as a reproducing apparatus according to the embodiment of the present invention can facilitate a smooth switching of content data to be reproduced, and prevent user's convenience from being decreased.

A preferred embodiment of the present invention has been explained in detail above with reference to the attached drawings, the present invention is not limited to this example. It should be understood by those skilled in the art that various modifications, combinations, sub-combinations and alterations may occur depending on design requirements and other factors insofar as they are within the scope of the appended claims or the equivalents thereof.

For example, a reproducing apparatus according to the embodiment of the present invention may have each of the reproducing processing unit 120 and the reproducing control unit 122 shown in FIG. 8 respectively (for example, realizes each of them with separate processing circuits).

Further, although a program (computer program) for causing a computer to function as a reproducing apparatus according to an embodiment of the present invention is provided in the above description, a recording medium that stores such a program may be further provided according to an embodiment of the present invention.

Moreover, the content reproducing system 1000 according to the embodiment of the present invention is not limited to be configured by apparatuses that comply with the DLNA standard, but may be configured by apparatuses that comply with an arbitrary standard capable of applying the switching approach according to the embodiment of the present invention.

The above-described configuration is an example of an embodiment of the present invention, which is intended for inclusion within the scope of the present invention.

The present application contains subject matter related to that disclosed in Japanese Priority Patent Application JP 2009-298149 filed in the Japan Patent Office on Dec. 28, 2009, the entire content of which is hereby incorporated by reference.

What is claimed is:

1. A reproducing apparatus comprising:
a communication circuit configured to communicate with a server that stores content data, and to communicate with a control apparatus that transmits, as a request for reproducing the content data stored in the server, a request for setting content data to be reproduced, a request for starting reproduction of the content data set by the request for setting content, or a request for stopping reproduction of the content data being reproduced according to request for starting reproduction; and
a processing circuit including
a reproducing processing unit configured to perform processing related to reproducing content data upon the request for starting reproduction that the communication circuit has received; and
a reproducing control unit configured to control a processing execution state related to reproducing the content data in the reproducing processing unit,
wherein the reproducing control unit
sets a primary standby time and maintains reproduction of the content in the reproducing processing unit until after the primary standby time has elapsed, when the request for stopping reproduction is received while the reproducing processing unit is reproducing the content data, or when the reproduction of the content data in the reproducing processing unit has ended,
further sets a secondary standby time after the primary standby time has elapsed and further maintains reproduction of the content in the reproducing processing unit until after the secondary standby time has elapsed, when the request for setting content is received before the primary standby time has elapsed,
causes the reproducing processing unit to reproduce content data that has been newly set by the request for setting content, when received the request for reproducing is received before the secondary standby time has elapsed, and
causes the processing execution state related to reproducing content data in the reproducing processing unit to transition from a reproducing state to a basic state in which content data is not reproduce, when the request for setting content is not received before the primary standby time has elapsed, or when the request for reproducing is not received before the secondary standby time has elapsed.

2. The reproducing apparatus according to claim 1, wherein the reproducing control unit sets the secondary standby time longer than the primary standby time.

3. The reproducing apparatus according to claim 1, wherein, responsive to the request for setting content, the reproducing control unit causes the reproducing processing unit to communicate with the server, when the request for setting content is received before the primary standby time has elapsed, and the reproducing control unit suspends setting the secondary standby time until communication between the reproducing processing unit and the server has been completed.

4. The reproducing apparatus according to claim 1, wherein the reproducing control unit sets the primary standby time, set when reproducing of the content data ends while the reproducing processing unit is in the reproducing state, longer than a primary standby time, set when the request for stopping is received while the reproducing processing unit is in the reproducing state.

5. The reproducing apparatus according to claim 1, wherein the reproducing control unit notifies a user that a request for reproducing the content data is received, when the request for setting content is received before the primary standby time has elapsed, or when the request for reproducing is received before the secondary standby time has elapsed.

6. The reproducing apparatus according to claim 1, wherein the reproducing control unit does not allow the reproducing processing unit to perform processing based on the request for stopping, when the request for stopping is received before the primary standby time has elapsed or when the request for stopping is received before the secondary standby time has elapsed.

7. A reproducing control method comprising:
reproducing, in a processing circuit, content data in response to a request for reproducing, when the request for reproducing, which has been transmitted from a control apparatus to reproduce content data stored in a server, and which requests starting reproduction of the content data;
setting, in the processing circuit, a primary standby time, and maintaining a reproducing state of the content data until after the primary standby time has elapsed, when a request for stopping reproduction of the content data is received while reproducing the content data, or when reproduction of the content data has completed;
setting, in the processing circuit, a secondary standby time after the primary standby time has elapsed, and further maintaining the reproducing state of the content data until after the secondary standby time has elapsed, when a request for setting content data to be reproduced is received from the control apparatus before the primary standby time has elapsed;
switching to reproduction of content data that has been newly set based on the request for setting content, when the request for reproducing is received before the secondary standby time has elapsed; and
transitioning, in the processing circuit, from a reproducing state of the content data maintained during the primary standby time or the secondary standby time to a basic state in which the content data is not reproduced, when the request for setting content is not received before the primary standby time has elapsed, or when the request for reproducing is not received before the secondary standby time has elapsed.

8. A non-transitory computer-readable medium encoded with computer-readable instructions thereon, the computer-readable instructions when executed by a computer cause the computer to perform a method comprising:
reproducing, in a processing circuit, content data in response to a request for reproducing, when the request for reproducing, which has been transmitted from a control apparatus to reproduce content data stored in a server, and which requests starting reproduction of the content data;
setting, in the processing circuit, a primary standby time, and maintaining a reproducing state of the content data until after the primary standby time has elapsed, when a request for stopping reproduction of the content data is received while reproducing the content data, or when reproduction of the content data has completed;
setting, in the processing circuit, a secondary standby time after the primary standby time has elapsed, and for further maintaining the reproducing state of the content data until after the secondary standby time has elapsed, when a request for setting content data to be reproduced is received from the control apparatus before the primary standby time has elapsed;
switching to reproduction of content data that has been newly set based on the request for setting content, when the request for reproducing is received before the secondary standby time has elapsed; and
transitioning, in the processing circuit, from a reproducing state of the content data maintained during the primary standby time or the secondary standby time to a basic state in which the content data is not reproduced, when the request for setting content is not received before the primary standby time has elapsed, or when the request for reproducing is not received before the secondary standby time has elapsed.

* * * * *